(12) United States Patent
Thomas et al.

(10) Patent No.: US 10,507,390 B2
(45) Date of Patent: Dec. 17, 2019

(54) SYSTEM AND METHOD OF GAMIFICATION OF REAL-LIFE EVENTS

(71) Applicants: Andrew Jack Thomas, San Antonio, TX (US); Jane Dudley, Conifer, CO (US)

(72) Inventors: Andrew Jack Thomas, San Antonio, TX (US); Jane Dudley, Conifer, CO (US)

(*) Notice: Subject to any disclaimer, the term of this patent is extended or adjusted under 35 U.S.C. 154(b) by 0 days.

(21) Appl. No.: 15/466,613

(22) Filed: Mar. 22, 2017

(65) Prior Publication Data

US 2017/0189811 A1 Jul. 6, 2017

Related U.S. Application Data

(63) Continuation of application No. 14/445,055, filed on Jul. 29, 2014, now Pat. No. 9,636,587, which is a (Continued)

(51) Int. Cl.
*A63F 13/65* (2014.01)
*A63F 13/79* (2014.01)
(Continued)

(52) U.S. Cl.
CPC .............. *A63F 13/65* (2014.09); *A63F 13/12* (2013.01); *A63F 13/31* (2014.09); *A63F 13/35* (2014.09);
(Continued)

(58) Field of Classification Search
None
See application file for complete search history.

(56) References Cited

U.S. PATENT DOCUMENTS 5,306,154 A 4/1994 Ujita et al.
6,164,971 A 12/2000 Figart
(Continued)

OTHER PUBLICATIONS

IBM Plays SimCity With Portland, Oregon—Slashdo—Via web at http://science.slashdot.org/story/11/08/10/0549213/IBM-Plays-SimCity-With-Portland-Ore((last viewed Aug. 2011).

*Primary Examiner* — Ronald Laneau
(74) *Attorney, Agent, or Firm* — Jason P. Webb; Pearson Butler

(57) ABSTRACT

There is a system and method for gamification of real-life events over a computerized network. The system includes an observer module configured to generate real-life data in response to observation of a real-life event. The system includes an interface engine module configured to operate an ongoing computerized game that includes game objects. The system includes an implementation module configured to receive an implementation instruction and automatically effect a real-world occurrence associated with the implementation instruction. The system includes a control module, including a processor, configured to convert real-life data from the observer module into a game object, provide the created game object to the interface engine module for injection into an ongoing computer game, and convert a player interaction into an implementation instruction and provide the same to the implementation module. The system includes a player module configured to permit a player to play the ongoing game.

20 Claims, 12 Drawing Sheets

Related U.S. Application Data continuation of application No. 13/627,144, filed on Sep. 26, 2012, now Pat. No. 8,821,272.

(60) Provisional application No. 61/539,176, filed on Sep. 26, 2011.

(51) Int. Cl.
*A63F 13/30* (2014.01)
*A63F 13/31* (2014.01)
*A63F 13/35* (2014.01)

(52) U.S. Cl.
CPC ...... *A63F 13/79* (2014.09); *A63F 2300/5513* (2013.01); *A63F 2300/69* (2013.01)

(56) References Cited

U.S. PATENT DOCUMENTS

| | | |
|---|---|---|
| 6,758,746 B1 | 7/2004 | Hunter et al. |
| 7,743,070 B1 | 6/2010 | Blumberg |
| 7,824,253 B2 | 11/2010 | Thompson et al. |
| 8,326,751 B2 | 9/2012 | Driemeyer et al. |
| 8,453,219 B2 | 5/2013 | Shuster et al. |
| 8,522,330 B2 | 8/2013 | Shuster et al. |
| 8,556,718 B2 * | 10/2013 | Hashimoto ............ A63F 13/10 463/1 |
| 8,851,993 B2 * | 10/2014 | Nishiya ................ A63F 13/10 463/1 |
| 2007/0197297 A1 * | 8/2007 | Witchey .................... A63F 9/24 463/42 |
| 2007/0225070 A1 | 9/2007 | Zahorik et al. |
| 2008/0096665 A1 | 4/2008 | Cohen |
| 2008/0146338 A1 | 6/2008 | Bernard et al. |
| 2009/0017886 A1 | 1/2009 | McGucken |
| 2009/0132416 A1 | 5/2009 | Titus et al. |
| 2009/0307608 A1 | 12/2009 | Kalasapur et al. |
| 2010/0121729 A1 * | 5/2010 | Betzler ................. A63F 13/12 705/26.1 |
| 2011/0112662 A1 | 5/2011 | Thompson et al. |

\* cited by examiner

SYSTEM AND METHOD OF GAMIFICATION OF REAL-LIFE EVENTS

CROSS-REFERENCE TO RELATED APPLICATIONS

This application is a Continuation application of, under 35 U.S.C. § 121, and claims priority to, under 35 U.S.C. § 121, U.S. Continuation application Ser. No. 14/445,055, entitled SYSTEM AND METHOD OF GAMIFICATION OF REAL-LIFE EVENTS, by Andrew Jack Thomas and Jane Dudley, filed on Jul. 29, 2014. This application is a Continuation application of, under 35 U.S.C. § 121, and claims priority to, under 35 U.S.C. § 121, U.S. Non-Provisional application Ser. No. 13/627,144, entitled System and Method of Gamification of Real-Life Events, by Andrew Jack Thomas and Jane Dudley, filed on Sep. 26, 2012. This invention claims priority, under 35 U.S.C. § 120, to the U.S. Provisional Patent Application No. 61/539,176 to Andrew Jack Thomas filed on Sep. 26, 2011, which is incorporated by reference herein.

BACKGROUND OF THE INVENTION

Field of the Invention

The present invention relates to an ongoing computer game, specifically to a system and method of gamification of real-life events.

Description of the Related Art

A video game is an electronic game that involves human interaction with a user interface to generate visual feedback on a video device. The electronic systems used to play video games are known as platforms; examples of these are personal computers and video game consoles. These platforms range from large mainframe computers to small handheld devices. Specialized video games such as arcade games, while previously common, have gradually declined in use. Video games have gone on to become an art form and industry.

The input device used to manipulate video games is called a game controller, and varies across platforms. For example, a controller might consist of only a button and a joystick, while another may feature a dozen buttons and one or more joysticks. Early personal computer games often needed a keyboard for game play, or more commonly, required the user to buy a separate joystick with at least one button. Many modern computer games allow or require the player to use a keyboard and a mouse simultaneously. A few of the most common game controllers are gamepads, mice, keyboards, and joysticks.

Video games typically use additional means of providing interactivity and information to the player. Audio is almost universal, using sound reproduction devices, such as speakers and headphones. Other feedback may come via haptic peripherals, such as vibration or force feedback, with vibration sometimes used to simulate force feedback.

Video gaming has traditionally been a social experience. Multiplayer video games are those that can be played either competitively, sometimes in Electronic Sports, or cooperatively by using either multiple input devices, or by hot seating. Since then, most consoles have been shipped with two or four controller inputs. Some have had the ability to expand to four, eight or as many as 12 inputs with additional adapters, such as the Multi-tap. Multiplayer arcade games typically feature play for two to four players, sometimes tilting the monitor on its back for a top-down viewing experience allowing players to sit opposite one another.

Many early computer games for non-PC descendant based platforms featured multiplayer support. Personal computer systems from Atari and Commodore both regularly featured at least two game ports. PC-based computer games started with a lower availability of multiplayer options because of technical limitations. PCs typically had either one or no game ports at all. Network games for these early personal computers were generally limited to only text based adventures or MUDs that were played remotely on a dedicated server. This was due both to the slow speed of modems and the prohibitive cost involved with putting a computer online in such a way where multiple visitors could make use of it. However, with the advent of widespread local area networking technologies and Internet based online capabilities, the number of players in modern games can be 32 or higher, sometimes featuring integrated text and/or voice chat. MMOs can offer extremely high numbers of simultaneous players; Eve Online set a record with 54,446 players on a single server in 2010.

Some improvements have been made in the field. Examples of references related to the present invention are described below in their own words, and the supporting teachings of each reference are incorporated by reference herein:

U.S. Pat. No. 7,743,070, issued to Blumberg, discloses a system, method, and apparatus is provided for computerized management of a method of corporate, business or sports management by a remote party comprising relating a current database of an entity. For instance, in sports management substantially real time management is possible. Data of a player together with a historical database related to that player and decisions can be transmitted. This is communicated between a central database processing resource and at least one remote party. A remote party is permitted to access the database and access designated data from the database, and input and output data. Voting and other management of the player, team, or business is possible in substantially real time or near real time by the remote party. A remote user can vote on financial compensation for a player, a coach or a team and/or for a bonus for a player, team or game. Similarly hiring and firing decisions can be made. Shareholders, fans or customers of an entertainment business such as sports can be more interactively involved in all aspects of management and ownership duties and thus be more thoroughly entertained.

U.S. Pat. No. 5,306,154, issued to Utija et al., discloses an intelligent education and simulation system which is capable of executing an optimized follow-up reeducation to the learner reflecting his/her idiosyncrasy toward understanding in learning. The intelligent education and simulation system has an execution instruction to execute a curriculum comprising a plurality of instruction courses regarding the subject teaching of an educational object and its simulation-based instruction. According to this execution instruction, intelligent computer assisted instruction of the subject teaching and the simulation-based instruction are implemented. The degree of understanding of these instructions by the learner is evaluated, and according to the degree of understanding thus comprehended, a pertinent follow-up instruction course(s) is chosen for reeducation. In this way, a pertinent reeducation instruction course(s) optimized for each learner is capable of being selected, and the time required for reeducation of the learner is minimized.

U.S. Patent Application Publication No.: 2011/0112662, by Thompson et al., discloses a system and a method is provided wherein real world monetary or cash values are placed on virtual world avatars, avatar possessed or avatar purchasable virtual world items, environmental virtual world items and virtual world computer generated non-player characters (NPCs), such as slayable beasts, monsters, creatures, or humanoids. These NPCs or other avatars (i.e., other players' avatars) have the ability to defeat and collect the cash value of avatars and their gear, thus gaining cash value for the NPC or the avatars. This cash value is then winnable by any avatar with the skill to best the NPC or other avatar. In this system and method, a real world cash value of an avatar is established and can be increased or decreased based upon the avatar's interaction with other avatars, the virtual world environment and/or a player's investment of real world cash value.

U.S. Patent Application Publication No.: 2009/0017886, by McGucken, discloses a video game method and system for creating games where ideas have consequences, incorporating branching paths that correspond to a player's choices, wherein paths correspond to decisions founded upon ideals, resulting in exalted games with deeper soul and story, enhanced characters and meanings, and exalted gameplay. The classical hero's journey may be rendered, as the journey hinges on choices pivoting on classical ideals. Ideas that are rendered in word and deed will have consequences in the gameworld. Historical events such as The American Revolution may be brought to life, as players listen to famous speeches and choose sides. As great works of literature and dramatic art center around characters rendering ideals real, both internally and externally, in word and deed, in love and war, the present invention will afford video games that exalt the classical soul, as well as the great books, classics, and epic films—past, present, and future.

U.S. Patent Application Publication No.: 2009/0307608, by Kalasapur et al., discloses a method for operating a local virtual world proxy is provided. A virtual world view is received corresponding to a virtual world client. Information about resources available to the virtual world client is obtained. Virtual representations of one or more resources available to a virtual world client are fetched. Then the virtual representations are injected into the virtual world view. The virtual world view is then forwarded to the virtual world client for display to a user of the virtual world client.

The inventions heretofore known suffer from a number of disadvantages which include being limited in function, being limited in use, not involving real-life interactions, not based upon real-life, not based upon real-time environments, being limited in interaction, being limited in application, failing to provide feedback, failing to educate, being too distant from real-life events, failing to promote collaboration, failing to promote socially responsible behavior, not being relevant, not integrating with social media platforms, failing to service non-profit organizations, and the like and combinations thereof.

What is needed is a system and method of gamification of real-life events that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available systems and methods of gamification. Accordingly, the present invention has been developed to provide a system and method of gamification of real-life events.

According to one embodiment of the invention, there is a method of gamification of real-life events over a computerized network. The method may include the step of receiving real-life data corresponding to an observation of a real-life event. The method may include automatically building a game object using a processor of an R-to-G translation module, the game object may be sharing a characteristic with the received real-life data and may include a variably selected characteristic that may not be associated with the real-life data.

The method may include the step of injecting the game object into an ongoing computer game such that a player of the ongoing computer game may be able to interact with the game object. The step of injecting the game object into an ongoing computer game may be performed such that a plurality of players may be able to interact with the game object. The method may also include the step of triggering a G-to-R translation module based on an interaction of a player with the game object. The method may include automatically creating an instruction using a processor of a G-to-R translation module, wherein the instruction may relate to deployment of real-life resources and may be derived from the interaction of a player with the game object.

The method of gamification of real-life events over a computerized network may include the step of generating virtual geographic information from real-life geographic information of the received real-life data and associating the virtual geographic information with the automatically build game object. The method may include notifying a plurality of players of the automatically created game object. The method may include the step of sensing a real-life event through a sensor module and generating real-life data therefrom. The method may further include collecting data about a real-life circumstance associated with the deployment of real-life resources and determining an impact of the deployment of the real-life resources, thereby forming impact data. The method may include the step of receiving impact data regarding determining an impact of the deployment of the real-life resources and altering a game object according to a characteristic of the impact data received.

The method may include the step of processing a plurality of interactions with the game object, thereby determining a composite interaction and wherein the step of triggering the G-to-R translation module may be based on the composite interaction and the instruction is derived from the composite interaction. The method may also include the step of notifying an expert of at least one of a characteristic of the automatically built game object and a real-life data characteristic, receiving an instructional reply from the expert and displaying the instructional reply to a player of the ongoing computer game. The method may further include the step of filtering a data feed associated with real-life events for a predefined characteristic, generating real-life data therefrom and providing such real-life data to an R-to-G translation module. The method may include the step of notifying a plurality of game players over a social media network of a characteristic of the automatically created game object.

According to one embodiment of the invention, there is a system for gamification of real-life events over a computerized network. The system may include an observer module that may be configured to generate real-life data in response to observation of a real-life event. The generated real-life data may include geographic data. The observer module may collect data about real-life circumstance associated with deployment of real-life resources by the implementation module and may determine an impact of the implementation instruction, thereby forming impact data. The observer module may filter a data feed associated with real-life events for a predefined characteristic, generating real-life data therefrom and providing such real-life data to an R-to-G translation module of the control module The system may include an interface engine module that may be configured to operate an ongoing computerized game that may include game objects with which a player may interact. The interface engine module may operate an ongoing multiplayer game experience. The interface engine module may operate an ongoing multiplayer game experience associated with a social media network.

The system may include an implementation module that may be configured to receive an implementation instruction and may automatically effect a real-world occurrence associated with the implementation instruction. The implementation module may distribute a sum of real-world currency to a recipient bank account in response to implementation instructions.

The system may also include a control module, that may include a processor, in communication with each of the observer module, the interface engine module, and the implementation module, with at least one such connection being over a computerized network. The control module may be configured to convert real-life data from the observer module into a game object, provide the created game object to the interface engine module for injection into an ongoing computer game, and convert a player interaction into an implementation instruction and provide the same to the implementation module.

The system for gamification of real-life events over a computerized network may include a player module that may be in communication with the interface engine module and may be configured to permit a player to play the ongoing game and wherein the control module includes an R-to-G translation module and a G-to-R translation module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
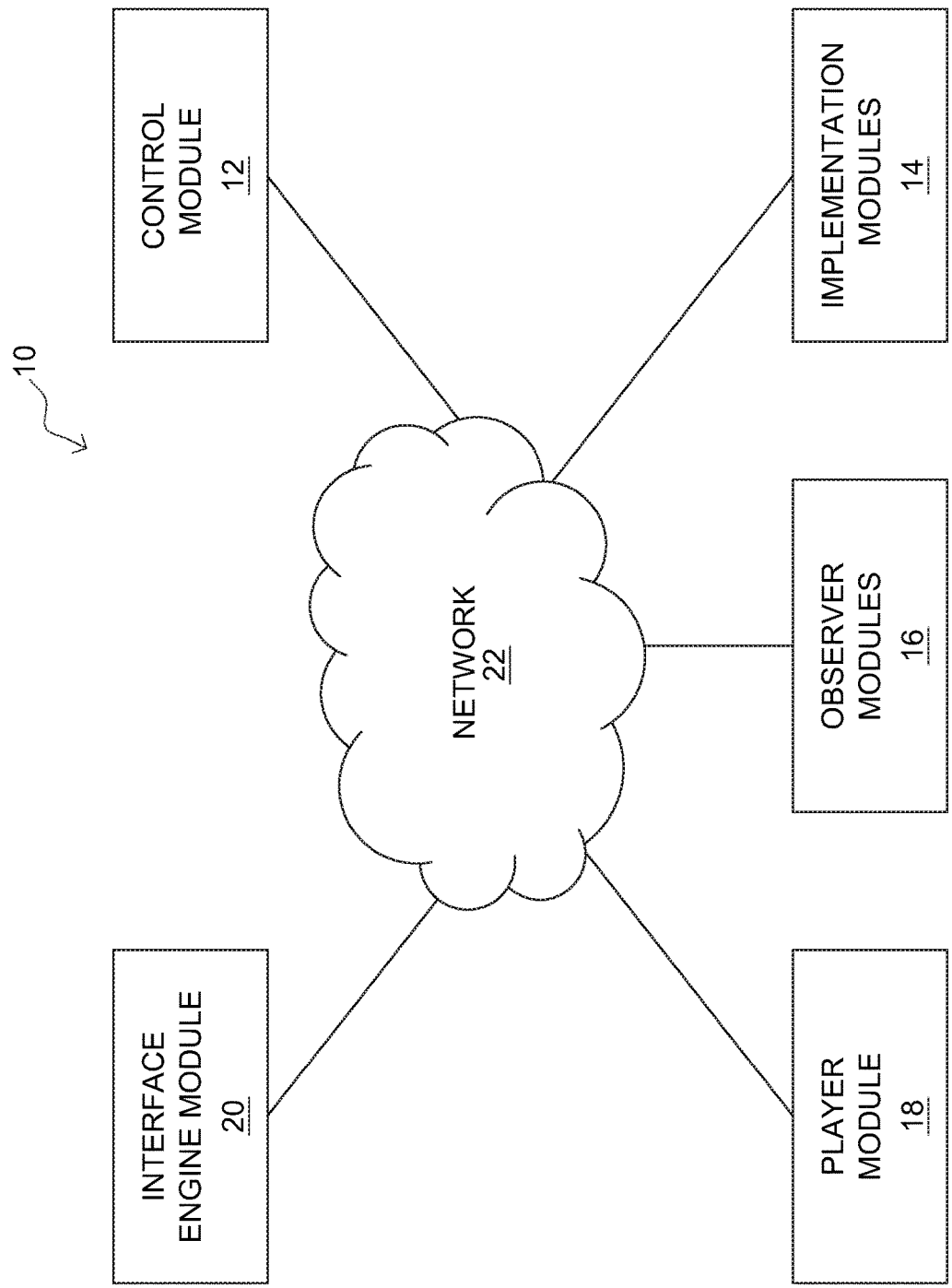
FIG. 1 is a network diagram of a system of gamification of real-life events, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor, and a plurality of databases. As those skilled in the art will appreciate, any computers discussed herein may include an operating system (e.g., Windows Vista, NT, 95/98/2000, OS2; UNIX; Linux; Solaris; MacOS; and etc.) as well as various conventional support software and drivers typically associated with computers. The computers may be in a home or business environment with access to a network. In an exemplary embodiment, access is through the Internet through a commercially-available web-browser software package.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, may be in communication with each other. Some non-limiting examples include communicating, sending, and/or receiving data and metadata via: a network, a wireless network, software, instructions, circuitry, phone lines, internet lines, satellite signals, electric signals, electrical and magnetic fields and/or pulses, and/or so forth.

As used herein, the term "network" may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps.

"Comprising" is to be interpreted as including the more restrictive terms "consisting of" and "consisting essentially of."

FIG. 1 is a network diagram of a system of gamification of real-life events, according to one embodiment of the invention. There is shown a system of gamification of real-life events 10 including a control module 12, an implementation module 14, an observer module 16, a player module 18, and an interface engine module 20 in communication over a network 22.

The illustrated system for gamification of real-life events 10 is configured to provide an interactive gaming platform associated with real-life events. Real-life events may be, but not limited to: natural disasters, economic issues, political issues, health epidemics, pollution issues, social issues, military issues, natural resources issues, etc. The system for gamification of real-life events 10 is configured to implement real-life events, such as global or national issues, into a gaming platform for a plurality of players to interact and solve issues having real-life scenarios in real-life events.

The system for gamification of real-life events 10 includes an observer module 16 configured to generate real-life data in response to observation of a real-life event. The observer module is in communication with an implementation module 14 and a control module 12 over a computerized network 22. The generated real-life data may include geographic data, climate data, financial data, economic data, health data, political data, etc. The observer module 16 is configured to collect data about real-life circumstance associated with deployment of real-life resources by an implementation module 14. The observer module 16 is configured to determine an impact of the implementation instruction, thereby forming impact data. The observer module 16 is configured to filter a data feed associated with real-life events for a predefined characteristic, generating real-life data therefrom and providing such real-life data to an R-to-G translation module of a control module 12.

The system of gamification of real-life events 10 includes an interface engine module 20 configured to operate an ongoing computerized game. The interface engine module 20 is in communication with the modules and components of the system 10 over a computerized network 22. The interface engine module 20 includes game objects with which a player may interact therewith. The interface engine module 20 is configured to operate an ongoing multi-player game experience over a computerized network 22. The interface engine module 20 is configured to operate an ongoing multi-player game experience associated with a social media network.

The system of gamification of real-life events 10 includes an implementation module 14 configured to receive an implementation instruction and automatically effect a real-world occurrence associated with the implementation instruction. The implementation module 14 is in communication with the various components and modules of the system 10 over a computerized network 22. The implementation module 14 is configured to distribute a sum of real-world currency to a recipient bank account in response to implementation instructions.

The system of gamification of real-life events 10 includes a control module 12 that includes a processor, in communication with each of the observer module 16, the interface engine module 20, and the implementation module 14, with at least one such connection being over a computerized network 22. The control module 12 is configured to convert real-life data from the observer module 16 into a game object. The control module 12 is also configured to provide the created game object to the interface engine module 20 for injection into an ongoing multi-player computer game. The control module 12 is configured to convert a player interaction into an implementation instruction and provide the same to the implementation module 14.

The system for gamification of real-life events 10 over a computerized network 22 includes a player module 18 in communication with the interface engine module 20. The player module 18 is configured to permit a player to play an ongoing multi-player computer game.

According to one embodiment of the invention, there is a network connecting each of one or more of an interface module, a control module, a players module, an observer module, and an implementation module. Accordingly, each of the modules may be connected in a manner that permits data to flow therebetween. The illustrated game system is configured to take real-world data, inject it into a game populated by a plurality of players, permit the players to interact therewith, generate a result, and implement the result in the real-world. Accordingly, players may be informed of real-world information while playing and may have a real-world impact on the same. One or more of these modules and/or modules not specifically named herein, may perform any of the functions, features, benefits, steps, methods, and etc. described herein.

In operation, the control module manages the system and may manage interactions between other modules. The interface module provides an architecture where players may gather and operate. The players module provides a user interface and/or client for users to interact with the system. The observer module observes, records, translates, and/or implements real-world events/information for the system into game-world objects/events. The implementation module observes, records, translates, and/or implements game-world events for implementation in real-world systems.

Advantageously, such a system may do one or more of the following: helps people keep an interest in such a game, provides real-world relevance and education, promotes globalization, promotes responsible behavior, promotes socially responsible behavior, mitigates problems from addictions (games, philanthropy, etc.), and the like. Such a system may be embodied as a massively-multiplayer online game that may be interfaced through a client on a user's machine, through an online portal, through a social networking infrastructure such as but not limited to those provided under the names of Facebook, Google+, LinkedIn, or the like or any combinations thereof.

Such a system may be interfaced by a personal computer, personal digital assistant, smartphone, dumbphone, television, tablet pc, or the like or combinations thereof.

In one embodiment, there may be a user community that may be managed by a community module such as but not limited to the infrastructure of social networking services (Facebook, LinkedIn, etc.), MMORPG games (guilds and guild management tools, geographic divisions, racial groupings, political groupings, etc.), and the like and combinations thereof. A community may be defined by a location, a region, a characteristic of its members (race, religion, wealth, beliefs, desires, name, etc.). Communities may include one or more characteristics (level, access to resources, access to tools, efficiency of use of resources and/or tools, location, size, reputation, pollution, wealth, influence, and etc.) controlled by a control module and such characteristics may be influence-able by players individually and/or collectively. A community may shift between phases of characteristics in a step or level like fashion and/or may shift along a continuum. Characteristics of a community may be associated with real-world data (pollution levels, weather, dramatic weather/global effects like tornados and earthquakes, disease levels, health and wellness levels, satisfaction levels, population, wealth, available natural resources, voting results, garbage output, recycling levels, energy consumption, consumer product consumption, and the like and combinations thereof) and/or may be associated with and/or influenced by actions of players, rules of the game, limitations of the game architecture, and the like and combinations thereof.

Players may be able to purchase virtual items in game, including but not limited to equipment, abilities, characteristics, buildings, technologies, intellectual property rights, commodities, options, influence tokens, user accounts, upgrades, and the like and combinations thereof. Players may be enabled to trade, sell, encumber, or otherwise treat as property such virtual items. Such items may be merely cosmetic (i.e. changing hair color on an avatar) or may have in game effects (i.e. commodities may be used to increase a virtual health level of a community). Such items may be purchasable, directly or indirectly, by real world currencies or equivalents. Transactions in real-world currencies may direct real-world currencies in part or in whole to funds that may be controlled and/or influenced by an implementation module, such that translated in-game actions may determine utilization of real-world funds to solve real-world problems such as but not limited to hunger, disease, political unrest, public safety, poverty, struggling economies, underfunded NGOs, and the like and combinations thereof.

There may be an expert/think tank system wherein experts may access and/or be accessible to players such that players may be educated and information may be shared in either direction. Accordingly, ideas for solving real-world problems developed through in-game efforts may be harvested and brought to the attention of experts in the fields related to such issues.

Players may be enabled to view actions and/or characteristics of their "friends" (those who they are associated with in-game and/or who may have selected to be associated with them).

Game complexity may be controlled by a control module and may be limited by limiting available information, actions, collaboration, contacts, friends, and the like and combinations thereof. Such may be limited by "level" of an account or avatar, credits earned, accomplishments made, user selection, user age, and the like and combinations thereof. Game complexity may adjust organically to a user as the user successfully accomplishes specific tasks and therefore is prepared for more complex game-play. There may be a virtual Earth that may simulate and/or be similar to the real Earth in identifiable respects (geography, size, colors, political regions, cities, races, populations, natural resources, weather, climate, and etc.). One or more identifiable respects may be determined by sampling real-world data and converting such data into in-game settings/configurations. Users may be associated with particular locations on the virtual earth (cities, countries, regions, villages, etc.) that may be associated with real locations on the real Earth. Users may be enabled to select and/or be randomly associated with particular regions, cities, villages and may be able to communicate with real-world communities in those locations through instant messaging, email, telephony, in-game actions that are translated to real-world implementations at such locations and the like and combinations thereof.

Wherein simulations of real-world problems are made available to hordes of game players and where game play is structured to promote the solution of such problems, it may be possible to test real-world solutions on a mass scale with access to a diversity of minds not otherwise available in any other context. It is believed that novel and ground-breaking solutions to some of the world's most serious problems may be discovered within the bounds of such a system as that described herein. Such a system may be implemented in a manner to address issues such as but not limited to city planning, education, philanthropy, social justice, social problems, advertising, raising money, awareness campaigns, business decision making, disaster prevention, disaster relief, self-improvement, personal planning, retirement planning, research, advocacy, travel, and the like and combinations thereof.

In one non-limiting embodiment, there is a fun and easy game wherein users create their own community within the framework of real-world conditions, relationships and/or events. It is the world we all live in translated in to a virtual game. Players may begin by choosing a place on planet Earth to develop a community and make it thrive. Locales in the game will reflect the real world in topography, weather, culture, beauty and/or challenges. As conditions change in the real world it may be simply represented in the game world. As a non-limiting example: When a player chooses to develop their community in the Amazon Basin the interaction with the game and others playing it may be massively different than a community at the North Pole. Players and/or may have objectives and/or the user may be faced with obstacles that are currently facing the Earth and its inhabitants. The solutions the user creates for these obstacles and the funds raised by users overcoming these obstacles may directly impact the corresponding real-world issue and/or locale and may do so in a manner that simulates, emulates, and/or may be associated in some characteristic with one or more solutions developed in-game.

Gameplay may be free, subscription based, free with premium pay options, etc., and the user may choose to purchase value-adds using online credits that may be purchasable with real-world currency in order to more rapidly enhance their community. Part of the revenue generated by these credit purchases may support real-world development in real-time through donations that may be automatically initiated or transacted according to instructions from a implementation module.

In one embodiment, a community is a single individual and/or individual user account and such a community may include any of the features and/or interactions described herein. Accordingly, a user account may have "levels" and/or other characteristics and/or any of the discussion herein relating to a community may apply to a single user as well. User account characteristics may affect how a user influences and/or contributes to another community, such as but not limited to altering a resource extraction efficiency, increasing a pollution level or rate by an amount different from other members of the community, and the like and combinations thereof.

There may be a module that promotes networking and relationship building such as but not limited to by introducing via an interface (may be searchable) users and/or user accounts (avatars) that may have a particular interest (in-game or otherwise) of meeting one another. In one non-limiting example, characteristics of a community may be influenced and/or altered according to the characteristics of those with whom they associate (mark as friends, includes as members, do business with, interact, etc.). A community may be influenced in its characteristics, opportunities, capabilities, and the like and combinations thereof according to the communities with which it associates and/or according to the characteristics of such communities.

Users may be asked questions and/or provided with choices and/or opportunities in-game. A system may track responses to such and/or interactions with such and may associate such data with demographic data of users and/or user accounts. Such information may be mined and/or packaged.

Users may be introduced to each other in real-life and such may be conditional on meeting certain requirements, achieving certain levels of performance, displaying certain characteristics, displaying certain interests and the like and combinations thereof.

A system may implement a technology tree, such as that used in the game series Civilization and/or those used in character ability progression in the game Diablo by Blizzard Entertainment, P.O. Box 18979, Irvine, Calif.

In-game "leveling" or otherwise improving characteristics of a community may be regulated, throttled, controlled, or otherwise influenced by real-world information such as but not limited to self-reported accomplishments of users, changes in real-world data feeds of an observer module, verified accomplishments of users, and the like and combinations thereof. Real-world accomplishments that may be offered/required may be offered in a tree structure such that access to opportunities are limited to those you have made available by achieving subordinate tasks/achievements. Rewards may be conditional on achieving certain degrees of completion of such trees. As a non-limiting example, a tree structure may bifurcate across interest lines (reading classic novels, viewing classic movies, performing volunteer work, learning emergency health skills, and etc.) and a requisite for being introduced to a person in real-life may be that you achieve an advanced level of achievement in a particular tree fork. Accordingly, users may be introduced to those who have a deep commitment to commonly shared interests/values.

There may be a map and/or display interface that may display friends, associates, relatives, enemies, business partners, and etc. graphically on a display in symbolic form using colors and/or symbols to represent characteristics thereof and such may be graphically organized by characteristic(s) wherein location and/or distance from a focal point may be related to one or more in-game characteristics.

Individuals at particular locales (villages and etc.), subject matter experts, game masters, customer support, and etc. may be provided avatars having special characteristics not duplicable by other users and/or may have abilities and/or influence that is different from that of remote users and such may toggle according to locale, region, community and the like.

There may be an interface that identifies users and/or characteristics of users that a community may benefit from association with. Such may be searchable and may include opportunities to connect and/or communicate therewith.

The following is a non-limiting prophetic example of a system according to one embodiment of the invention:
How May the Events be Found:
1. NGO partnerships—A system will be working with many non-profit organizations around the globe, directly and/or through connected systems (banking, communication, warehouse automation, fulfillment centers, and etc.). When there is a need for funds or ideas to help any of their projects they will contact System through a committee and/or module whose job it is to find real-world game content.
2. System Committee/module—There will be a committee/module designed to search for game content around the globe. This content will be philanthropic as well as mundane real-world drama (floods, high winds, earthquakes, etc.). There will be partitions of this committee designated to the different regions of the world so that game content always reflects (in real-time) the real-world.
How May Found Events be Chosen:
1. Relevance to the region of the users' gameplay—Events will be filtered by the region of the world they exist in. Users in the Amazon Basin won't experience floods that are occurring in Greenland.
2. Size event and level of users' gameplay—Small events such as localized flooding and minor storms may not be included in the game at the lower levels of gameplay. As the user progresses in the gameplay these more minor issues may come up. There may be a System interface that talks with modules of local online news and weather stations and have a running weather pattern that reflects these locales.
3. Disasters or major successes around the globe—Users will be shown major disasters and cultural successes around the globe in order to be part of them. During disaster times (i.e. Hurricane Katrina or the Tsunami of Japan) 100% of such proceeds will go to these causes and such distributions may be according to interactions/choices/selections/etc. of users/communities in the game.
What May Happen after Found Events are Chosen:
1. The committee/module will give the necessary information to the programmers/modules who will incorporate them in to the game.
2. Forums will be opened to chat about causes and solutions in the game.
3. There will be many different outcomes to introduced problems as every user will think a little bit differently.
4. The user will have to either have their community organically grow to the point of overcoming obstacles or they can speed up the process by purchasing value-adds.
How Gameplay May Translate to the Real World:
1. The real-world events that are introduced in to the game will be looked at by millions of users daily. The large amount of data gathered by monitoring their solutions will be given to the appropriate real-world organization so that they may better be able to solve their real problems.
2. Utilizing each of Earth's unique global and regional challenges to power diverse and ever changing inter-game game play is the cornerstone of Thrival. Leveraging each of the challenges presented within the game (delivered from the real world) the System will use Player interactions, ideas and solutions to stamp out issues arising within the game.
3. The money paid to System through the purchase of value-adds and other means will go to directly funding the corresponding real-world cause.
(Non-limiting example) A solar technology powering an orphanage in a rural village may be showcased and possibly used in the virtual gameplay and then supported in reality based off in game success which will be used as a testing ground for new products to inspire, motivate and deliver hope to the world. Funds raised by users purchasing in-game value-adds will also go to help fund the real-world event. Building interactions and game play off of solutions instead of problems creates a mindset of hope as opposed to despair. Accordingly, the system is a conduit for change through hope, via the will and inherent desire for people to do good, we just highlight those positive interactions.

In one non-limiting prophetic embodiment, there may be a game having four stages/phases of play with each stage giving the players more options, opportunities, and challenges and/or wherein players create, manage, improve, deploy, fund, and/or the like their own virtual enterprise/ community NGO, Foundation, for-profit charity, or Social Enterprise or the like that may be associated legally, electronically, financially, or otherwise functionally with one or more real NGOs, foundations, for-profit charity, social enterprises or the like or combinations thereof. Prizes may be awarded for accomplishments, achievements, victories, randomly, participation, and the like and combinations thereof. Other embodiments may include any of the features, functions, benefits, conditions, results, and the like and combinations thereof of the following described embodiment in any combination with or without other such features/etc. despite language to the contrary (explicit or otherwise) hereafter:

As a non-limiting example: In the beginning of the game the User/player is focused on building their own community without the ability to connect globally. Once the User has reached a point of developmental advancement sufficient to have such things as an airport or higher education they will be able to interact with other players and scenarios on a global scale.

First phase-village—The name of the game in the first stage is personal development. The User will be developing solely within his/her own village. This is a time of learning how to play and getting a feel for how to thrive within the game. The User will be building basic structures and will be given basic challenges that represent real challenges the globe is facing within a timeframe i.e. natural disasters etc. The challenges will be mainly environmental and human.

Ideas of helping one another and being kind will be introduced in this level of gameplay.

Second Phase-Community—As the User progresses to the second phase of the game they will be given more ways to create a unique community (colors and shapes of buildings, altering land features to in order for their community to grow etc.). The challenges will be more closely related to the real-world events happening in their region, the solutions and funds created by the user will start to shape their community as well as directly assisting the corresponding real-world cause. The User is still focused on developing their own community. During phase two technology, industry, culture, etc. will evolve. Player caused events and consequences to their actions whether positive or negative will begin to occur (if the user decides to cut down a forest to build houses they must manage it so as not to run out or if they choose to build a dam to increase power they can now make a recreation area or a fishery etc.). As the User plays and creates they will be given more technologies and industry opportunities. New opportunities will be given in a logical order as the User decides what kind of community they want. As a non-limiting example, if the User is given a choice between building an Art School or building a Flea Market the resulting string of decisions will be altered and the direction of the community will start to take shape.

The first ideas of philanthropy and social enterprise will generally start in the second phase.

Third Phase-Global Community—When the User has developed their community a point that would be logical to play on a global scale (if they have an airport and higher education, or if they have proper communications or have explored enough of their map). At this point they will be able to view other communities around the globe (friends in their network or computer-run developed cities). In the third phase the user will be able to get ideas from others playing the game around the world about fun ways to develop their community. All players networked together will be able to trade resources and the in-game monetary system. In this phase the challenges introduced in to the game will very closely reflect those in the world both in timing and severity. The Users will be able to rally together and lend support to one another. As a reward for helping other communities the User will be given tokens of appreciation whether by the user or by other players. (If there is a flood in Ecuador it will appear in the game and people with communities in that region will have to find ideal solutions. If other players around the globe lend their support/donate funds they will get pictures or video clips or notes of appreciation and the funds/solutions will go to aiding the cause in real-time). The incentive for helping other communities is two/fold: 1—user is getting something from the community whether its trade or culture or are returning a favor 2—user is helping for the sake of helping and desire the token. When the gameplay is broadened to this point the user will be able to choose a region of the world to focus on and develop a relationship with. Depending on which region they choose they will have a different set of products, commodities, technologies to trade.

Fourth Phase-Socio Global Community—In a non-limiting embodiment, during advanced stages of game play, the user may be introduced to many of the social problems/issues affecting the real world. The user may have to find a solution to the social problems, such as but not limited to: obesity, drug use, abortion, crime, unemployment, eating disorders, bullying, etc. The game play may be a testing ground for solutions to not only social problems but problems affecting cultures throughout the real world.

In a non-limiting embodiment, players may be presented with one or more objectives and/or one or more problems/challenges. Players may be able to overcome such through game play, skill, persistence, and/or through purchasing in game objects. Funds received by such a game may be directed to an organization associated with the players virtual community. The game may teach, through presentation of information, tasks, challenges or the like or combinations thereof, effective and sustainable development principles and other valuable skills. Credits or virtual currencies from third party systems may be accepted by the system and may be used to purchase in game items and/or real world items. Players and/or people associated with the players virtual community may upload media files that may be functionally associated with the virtual community. As a non-limiting example, a person living in a village that benefits from a players virtual community may upload a photo of the people of the village and that photo may be displayed in association with the virtual community in a picture library, an interface background, a splash screen, or the like or combinations thereof. Such media files may include data regarding challenges facing such a community and may impact game play through display and/or through integration in game mechanics. As a non-limiting example, photos of a real community devastated by a flood may be uploaded into a game system and may be associated with a virtual community. Users may be offered the ability to purchase (with real money, third party credits, in game currency, or merely by percentage allocation or the like or combinations thereof) a variety of supplies, services and the like and the choices of the players associated with that virtual community may be processed and utilized to direct a real-world support effort, such as but not limited to determining the amounts, proportional or otherwise, of various supplies and services to provide and/or the timing for providing the same. Advantageously, the collective will, intelligence, and desire of a community of players may be directed to management of disaster relief. Such a game may be embodied and/or interface with users as a smartphone or tablet pc application. Such a system may include advertising platforms. There may be a system for matching philanthropic funds with game player funds such as a system that coordinates a donation from a large donor wherein the large donor funds are distributed in association with and/or contingent on matching (1:1 or in any other ratio and/or ratios computed by formula, schedule, random number generation or otherwise determined) purchases of game players. Accordingly a large donor may leverage their donation and players may experience a larger than realistic real-world impact of their funds. Such a game may be associated with a social network like Facebook and may periodically and/or conditionally generate "Wall posts" and the like.

Other embodiments may include any of the features, functions, benefits, conditions, results, and the like and combinations thereof of the following described embodiment in any combination with or without other such features/etc. despite language to the contrary (explicit or otherwise) hereafter.

In one embodiment of the invention, the game play may include an affiliation or association with a non-profit organization, wherein a user or a plurality of users may be able to donate funds or volunteer time through the game play to a non-profit organization.

In one embodiment of the invention, the game play may include topographical interface with a global mapping interface module, such as but not limited to Google Earth, manufactured by Google Inc., 1600 Amphitheatre Parkway, Mountain View, Calif., 94043. The game play may include locations resembling real world locations, terrain, climates, environments, etc.

In one embodiment of the invention, a user may create a customized avatar configured to navigate through the game play. The avatar may be customized to include any feature, ability, personality, look, etc. customizable by a user.

Figure 2:
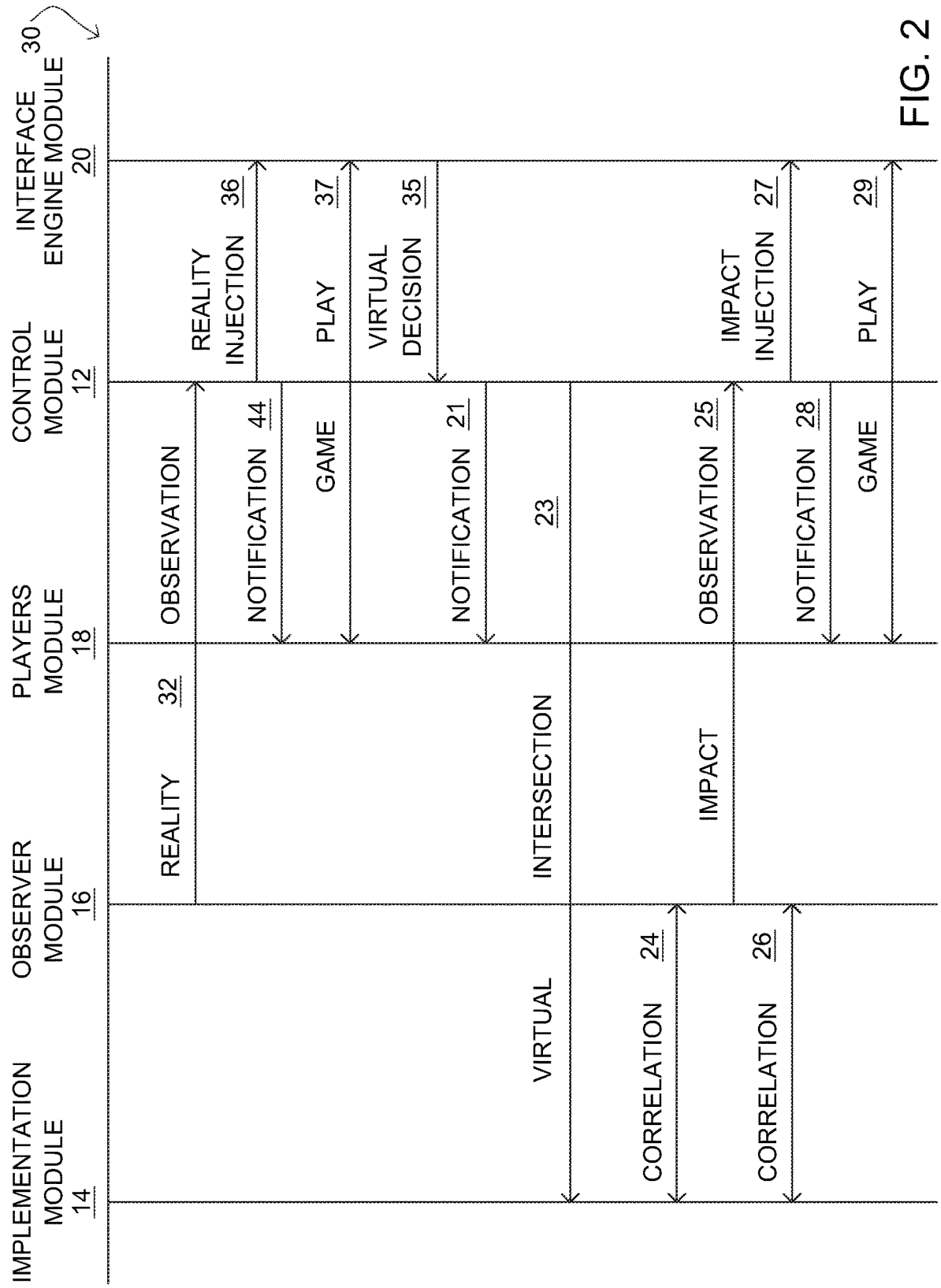
FIG. 2 is a sequence diagram of a method of gamification of real-life events, according to one embodiment of the invention.

FIG. 2 is a sequence diagram of a method of gamification of real-life events, according to one embodiment of the invention. There is shown a method of gamification or real-life events 30.

The illustrated method of gamification of real-life events 30 includes the step of receiving real-life data corresponding to an observation of a real-life event 32. Such may include but is not limited to direct observation of sensory data through a transducer (heat sensor, temperature sensor, wind speed sensor, electric field sensor, radar, etc.) through observation of a set of sensors, receipt through an RSS feed, news data feeds, web crawling, web spiders, data filtering, database mining, and the like and combinations thereof. The real-life data is sent by an observer module 16 over a computerized network to a control module 12. The control module 12 is configured to automatically build a game object using a processor of an R-to-G translation module, the game object sharing a characteristic with the received real-life data and including a variably selected characteristic that is not associated with the real-life data. A game object may be embodied as a non-player character controlled by a script, a virtual location, a characteristic modification overlay of another game object already in play, a display layer, a scripted series of events/questions, a problem-set, and the like and combinations thereof.

The method of gamification of real-life events 30 includes the step of injecting the game object into an ongoing computer game 36 such that a player of the ongoing computer game is able to interact with the game object, wherein the control module 12 sends data to the interface engine module 20 over a computerized network. Injection may be accomplished by updating game engine interfaces of users with the additional game object, by altering a game data feed to players, by re-initialization of a game server, by operation of a game object creator function within the game, and the like and combinations thereof. The control module 12 is configured to notify a plurality of players of the automatically created game object based on real-life data 44. Such may be accomplished by updating a display parameter, sending an email to affected players, may occur "naturally" by interaction of the game object with the play environment, and the like and combinations thereof.

The method of gamification of real-life events 30 includes the step of a plurality of players interacting with the game object and the ongoing computer game 37. The plurality of player modules 18 are configured to interact with the game object and the surrounding ongoing computer game through the interface engine module 20. This may include making selections, giving commands, purchasing real/virtual objects, deployment of resources, coordination with other players, trading with other players and the like and combinations thereof. During such interaction a virtual decision 35 may be generated and/or recorded. Such a virtual decision may be a composite decision among a group of players such as but not limited to a result of a vote on how to solve a particular problem associated with the injected game object, may be a composite decision on how to allocate resources among a variety of solutions wherein each vote allocates a proportionate amount of resources, may be a decision of a single player, and the like and combinations thereof. Such a decision may be automatically culled from player interactions with the injected game object and/or other game objects. The players may be notified 21 in regards to the virtual decision and/or characteristics thereof. An implementation module 14 may be notified of the virtual decision and/or may otherwise have access to such and may then implement one or more aspects of the decision. Such may be accomplished by issuing instructions to one or more people and/or computing devices for actions to be taken in real-life and/or resources to be deployed, including but not limited to instructions related to when, where, who, how and what to do. One or more people and/or computer controlled devices (robots, bank accounts, vehicles, utilities, and the like and combinations thereof) may be agents of the players of the game by virtue of the virtual decisions culled from their game interactions and also correlate therewith 24. An observer module 16 may include one or more sensors, feeds, data-sets, databases, and the like that may be observing and/or otherwise associated with the agents, computer controlled or otherwise, and may thereby report on activities taken by the agents and/or results of such activities. Such observations by the observer module may be converted to impact observation data, configured to provide impact injection 27 into an interface engine module 20, by filtering, collating, coordinating, comparing, contrasting and the like data with previous data, expected data, projections, and the like and may then be reported to players 28 through the control module 12 when it receives such an impact observation 25. Impact observations 25 may be converted to game objects and/or may be used to modify an existing game object. Game play may continue such that incremental and/or recursive actions may be taken by players in regards to a particular game object/real-life issue. Advantageously, incremental solutions may be developed that take advantage of the addictive nature of game play combined with feedback information and real-life resource deployment. The implementation module 14 may also receive data from the observer module so that it may correlate 26 its activities with the data being sent back to the control module. Such information may be used to clarify instructions, alter behaviors, confirm execution of instructions and the like and combinations thereof.

According to one embodiment of the invention, there is a plurality of modules in communication, wherein an observed characteristic of reality is observed and information associated therewith is transmitted to a control module where it is processed and a reality injection instruction set is generated and passed to an interface engine where such is implemented into a game engine of a game having a player or players. A notification of such an injection is sent to a player module to notify players of an injected event and the players interact with the same as game play. Such game play results in a virtual decision being generated and passed to the control module where it is processed and a notification is generated that is passed to the players. A virtual injection instruction set is generated by the control module and passed to an implementation module where it is processed and implemented. Correlation data is passed between the implementation module and the observer module such that the system can recognize any changes in characteristics that may occur over time and may require adjustments to actions taken by the system. The illustrated observer module takes data regarding the implementation and processes such into impact information and passes the same to the control module where it is processed into impact injection information and passed to the interface engine where it is injected into the game. Notification is provided again to the player modules and game play occurs in association with the impact injection implemented in the game.

Figure 3:
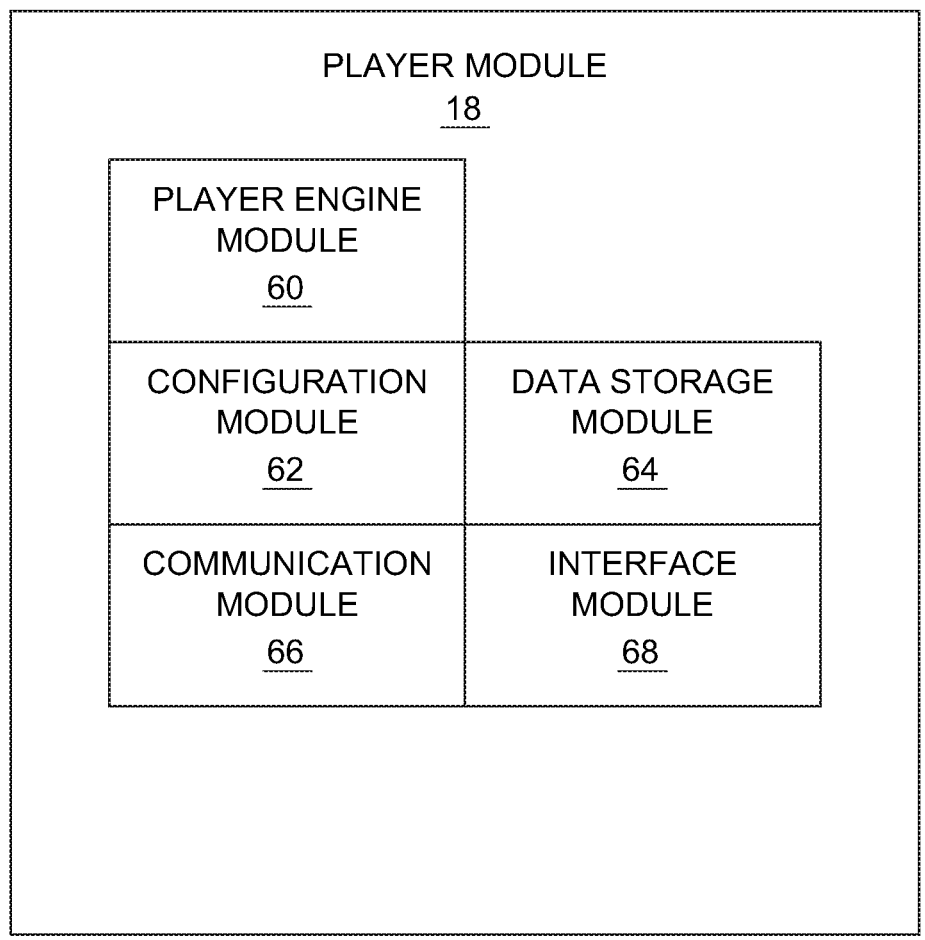
FIG. 3 is a module diagram of a player module of a system of gamification of real-life events, according to one embodiment of the invention.

FIG. 3 is a module diagram of a player module of a system of gamification of real-life events, according to one embodiment of the invention. There is shown a player module including a player engine module 60, a configuration module 62, a data storage module 64, a communication module 66, and an interface module 68.

The illustrated player module 18 is in communication with an interface engine module of a system of gamification of real-life events over a computerized network. The player module 18 is configured to permit a player to play an ongoing multi-player computer game. Each of the illustrated modules is in communication with other modules described herein to the degree needed and/or appropriate to perform one or more of the functions, features, benefits, steps, methods, and etc. described herein.

The player module 18 includes a player engine module 60 in communication with the modules and components thereof. The player engine module 60 is configured to perform operations and/or calculations relevant to an ongoing computer game, such as but not limited to processing graphical display information relevant to a point of view of a particular user. The player engine module 60 is configured to generate display information to a point of view of a particular user based upon real-life events or data, which may depend upon a geographical location of a particular user. Non-limiting examples of a player engine module may be a system as described in U.S. Pat. No. 4,862,392, issued to Steiner; or a system as described in U.S. Pat. No. 5,606,657, issued to Dennison et al., which are incorporated for their supporting teachings herein.

The player module 18 includes a configuration module 62 in communication with the modules and components of the player module 18. The configuration module 62 includes a listing of configuration settings that are relevant to operation of one or more modules of the player module 18. Non-limiting examples of such include: a metadata header of a file, a config file, an index, an xml file, and the like and combinations thereof. The configuration module 62 is configured to provide configuration settings to each of the modules and components of the player module 18, including saving settings for a particular user or character. Non-limiting examples of a configuration module may be a system as described in U.S. Pat. No. 7,587,522, issued to Wu; or a system as described in U.S. Pat. No. 6,161,176, issued to Hunter et al., which are incorporated for their supporting teachings herein.

The player module 18 includes a data storage module 64 in communication with the modules and components thereof. The data storage module 64 is configured to store data received and sent from the players/users of the ongoing computer game. The data storage module 64 is also configured to store data transferred between the players/users interacting with game objects and overall game play of an ongoing computer game. Data storage modules may be databases or data files, and the memory storage device may be hard drives or tapes. A non-limiting example of a data base is Filemaker Pro 11, manufactured by Filemaker Inc., 5261 Patrick Henry Dr., Santa Clara, Calif., 95054. The data storage module may include a flash storage drive. Non-limiting examples include: a HP Storage Works P2000 G3 Modular Smart Array System, manufactured by Hewlett-Packard Company, 3000 Hanover Street, Palo Alto, Calif., 94304, USA; a Sony Pocket Bit USB Flash Drive, manufactured by Sony Corporation of America, 550 Madison Avenue, New York, N.Y., 10022.

The player module 18 includes an interface module 68 in communication with the modules and components thereof. The interface module 68 is configured to provide interface controls to a user to access content or data of the game play of an ongoing computer game over a computerized network. The interface module 68 includes a display module configured to provide visual display to a player/user while interacting and navigating the content or data of the game play of an ongoing computer game over a computerized network. The display module may be a television, computing device monitor, mobile device screen, tablet, etc. The display module is configured to provide video conferencing capabilities, wherein the player/user is in communication with another player/user through the interface module 68. Non-limiting examples of a display/interface module may be a display/interface module as described in U.S. Pat. No. 6,272,562, issued to Scott et al.; a touch screen interface module as described in U.S. Pat. No. 5,884,202 and U.S. Pat. No. 6,094,609, issued to Arjomand, which are incorporated for their supported teachings herein. The interface module may be a HTML player, client server application, Java script application. A non-limiting example of an interface module is FlowPlayer 3.1, manufactured by FlowPlayer LTD, Hannuntie 8 D, ESPOO 02360, Helsinki, Finland.

The player module 18 includes an interface module 68 includes an input module in communication with the communication module 66 and is configured to provide input means to a player/user. The input module includes a keyboard or input device configured to provide input capabilities to a player/user to navigate and interact with an ongoing computer game over a computerized network. The input module may include an abbreviated keyboard configured to provide input capabilities to a player/user. The input module includes a microphone module configured to receive and store voice data of a player/user, thereby providing voice transmitting capabilities to a player/user in coordination with the display module of the interface module 68. Non-limiting examples of an input modules may be a keyboard module as described in U.S. Patent Publication No.: 2005/

0099394, by Chou et al.; or a keyboard as described in U.S. Patent Publication No.: 2006/0250367, by Tabasso et al.

The player module 18 includes a communication module 66 in communication with the interface module 68 of a player module 18. The communication module is configured to provide communication means to a player/user of a player module 18 over a computerized network. The communication module is in communication with a computerized network and is configured to transmit and receive data therethrough. The communication module 66 includes wireless communication means, in addition to a direct line communication connection. The communication module 66 includes a security module configured to provide a secure connection to a computerized network and transmission therethrough. Non-limiting examples of a communication module may be but not limited to: a communication module described in U.S. Pat. No. 5,307,463, issued to Hyatt et al.; or a communication module described in U.S. Pat. No. 6,133,886, issued to Fariello et al. which are incorporated for their supported herein.

Figure 4:
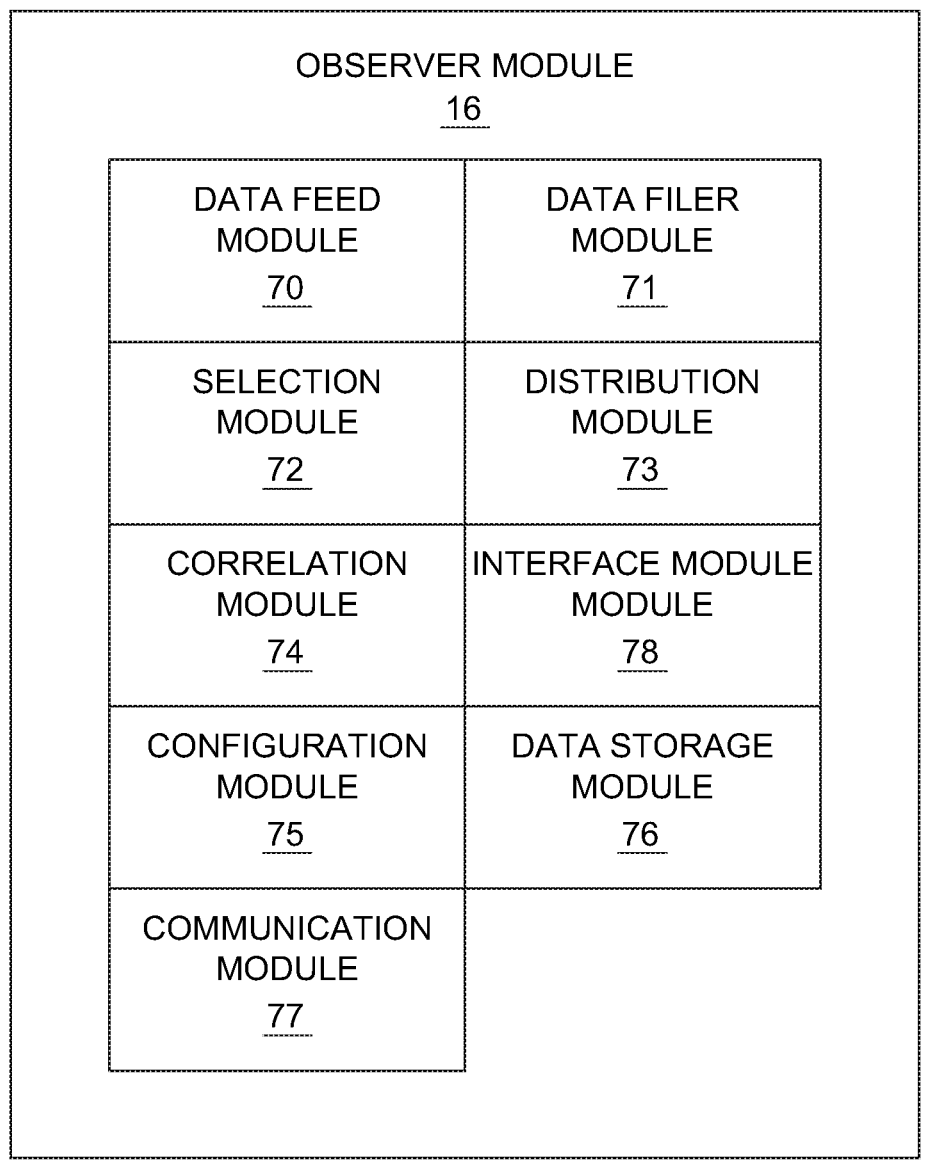
FIG. 4 is a module diagram of an observer module of a system of gamification of real-life events, according to one embodiment of the invention.

FIG. 4 is a module diagram of an observer module of a system of gamification of real-life events, according to one embodiment of the invention. There is shown an observer module 16 including a data feed module 70, a data filter module 71, a selection module 72, a distribution module 73, a correlation module 74, an interface module 78, a configuration module 75, a data storage module 76, and a communication module 77.

The illustrated observer module 16 is configured to generate real-life data in response to observation of a real-life event. The observer module 16 is in communication with an implementation module and a control module of a system of gamification of real-life events over a computerized network. The generated real-life data may include geographic data, climate data, financial data, economic data, health data, political data, etc. The observer module 16 is configured to collect data about real-life circumstance associated with deployment of real-life resources by an implementation module of a system of gamification of real-life events. The observer module 16 is configured to determine an impact of the implementation instruction, thereby forming impact data. The observer module 16 is configured to filter a data feed associated with real-life events for a predefined characteristic, generating real-life data therefrom and providing such real-life data to an R-to-G translation module of an control module of a system of gamification of real-life events.

The observer module 16 includes a data feed module 70 in communication with the modules and components thereof. The data feed module 70 includes one or more data receivers, transducers, sensors, data spiders, or the like and any combinations thereof configured to observe and report characteristics such as but not limited to temperature, wind speed, pollution levels, reported demographic statistics, news articles, crawled internet information, economic data, financial data, climate data, environment data, and the like and any combinations thereof. The illustrated data filter module 70 includes one or more systems configured to review data and route/pass/transfer such data according to a schedule, screen, list, checklist, formula, and the like and any combinations thereof over a computerized network. Non-limiting examples of a data feed module may be a system as described in U.S. Patent Publication No.: 2004/0039801, by Srinivasan et al.; or a system as described in U.S. Pat. No. 7,382,286, issued to Cole et al., which are incorporated for their supporting teachings herein.

The observer module 16 includes a data filter module 71 in communication with the data feed module 70. The data filter module 71 is configured to filter data sets from the data feed module 70 based upon real-life events and player interaction with game objects of an ongoing computer game. The data filter module 71 is configured to sort, report, organize, manage, categorize, correlate, compare, scan, search, filter, separate, and combine data sets from the data feed module in preparation for injection into an ongoing computer game. Non-limiting examples of a data filter module may be a filter module as described in U.S. Pat. No. 7,493,286, issued to Fienley et al.; or a filter module as described in U.S. Pat. No. 7,487,254, issued to Walsh et al., which are incorporated for their supporting teachings herein.

The observer module 16 includes a selection module 72 in communication with the modules and components of the observer module 16. The selection module 72 is configured to flag data records to be of particular significance wherein they meet specific criteria that may be included in a configuration file, or otherwise available to the selection module 72. Such flags may identify desired routing paths for the data (i.e. send this to all virtual communities associated with Argentina and to all expert user accounts associate with geology and volcanoes), and/or may be otherwise used to process, route, destroy, combine, collate, or otherwise manipulate such data. Non-limiting examples of a selection module may be a system as described in U.S. Patent Publication No.: 2004/0196306, by Manto et al.; or a system as described in U.S. Pat. No. 7,975,309, issued to Li, which are incorporated for their supporting teachings herein.

The observer module 16 includes a distribution module 73 in communication with the modules and components of the observer module 16. The distribution module includes instructions for distributing data of the observer module 16 to other modules, user accounts, administrators, players, virtual communities, real-world communities/organizations, and the like and any combinations thereof. The distribution module includes a data set matching recipients with recipient characteristics and communication addresses and protocols. Non-limiting examples of a distribution module may be a distribution module as described in U.S. Pat. No. 7,645,168, issued to Neumetzler et al.; or a distribution module as described in U.S. Pat. No. 7,131,845, issued to Mueller et al., which are incorporated for their supporting teachings herein.

The observer module 16 includes a correlation module 74 in communication with the modules and components of the observer module 16. The correlation module 74 includes instructions and/or systems for matching associated data, comparing/combining the same, and processing such comparisons to provide statistical or other data/conclusions/results/etc. such that actions of other modules and components of the observer module 16 may be audited, results may be compared to efforts expended to obtain such results, changes in circumstances may be monitored, recorded and reported, and the like and combinations thereof. Such a system may include controls for data formatting, data conversion, statistical processing, reporting templates, error checking, and the like and combinations thereof. Non-limiting examples of a correlation module may be a system as described in U.S. Patent Publication No.: 2005/0283337, by Sayal; or a system as described in U.S. Pat. No. 7,940,672, issued to Chen et al., which are incorporated for their supporting teachings herein.

The observer module 16 includes a configuration module 75 in communication with the modules and components of the observer module 16. The configuration module 75 includes a listing of configuration settings that are relevant to operation of one or more modules of the observer module 16. Non-limiting examples of such include: a metadata header of a file, a config file, an index, an xml file, and the like and combinations thereof.

The observer module 16 includes a data storage module 76 in communication with the modules and components of the observer module 16. The data storage module 76 is configured to store data received and sent from the player/user of an ongoing computer game. The data storage module 76 is configured to store data transferred between the players/users of the ongoing computer game and the game play and interaction therebetween.

The observer module 16 includes an interface module 78 in communication with the modules and components of the observer module 16. The interface module 78 is configured to provide interface controls to a player/user to access content or data of an ongoing computer game over a computerized network. The interface module 78 includes a display module configured to provide visual display to a player/user while interacting and navigating the content or data of the ongoing computer game over a computerized network. The display module may be a television, computing device monitor, mobile device screen, tablet, etc. The display module is configured to provide video conferencing capabilities, wherein the player/user is in communication with another player/user through the interface module 78.

The interface module 78 includes an input module in communication with a communication module 77 and is configured to provide input means to a player/user. The input module includes a keyboard or input device configured to provide input capabilities to a player/user of an ongoing computer game over a computerized network. The input module may include an abbreviated keyboard configured to provide input capabilities to a player/user. The input module may include a microphone module configured to receive and store voice data, thereby providing voice transmitting capabilities to a player/user in coordination with the display module of the interface module 78.

The observer module 16 includes a communication module 77 in communication with the interface module 78 and is configured to provide communication means to the player/user over a computerized network. The communication module is in communication with a computerized network and is configured to transmit data therethrough. The communication module includes wireless communication means, in addition to a direct line communication connection. The communication module includes a security module configured to provide a secure connection to a computerized network and transmission therethrough.

Figure 5:
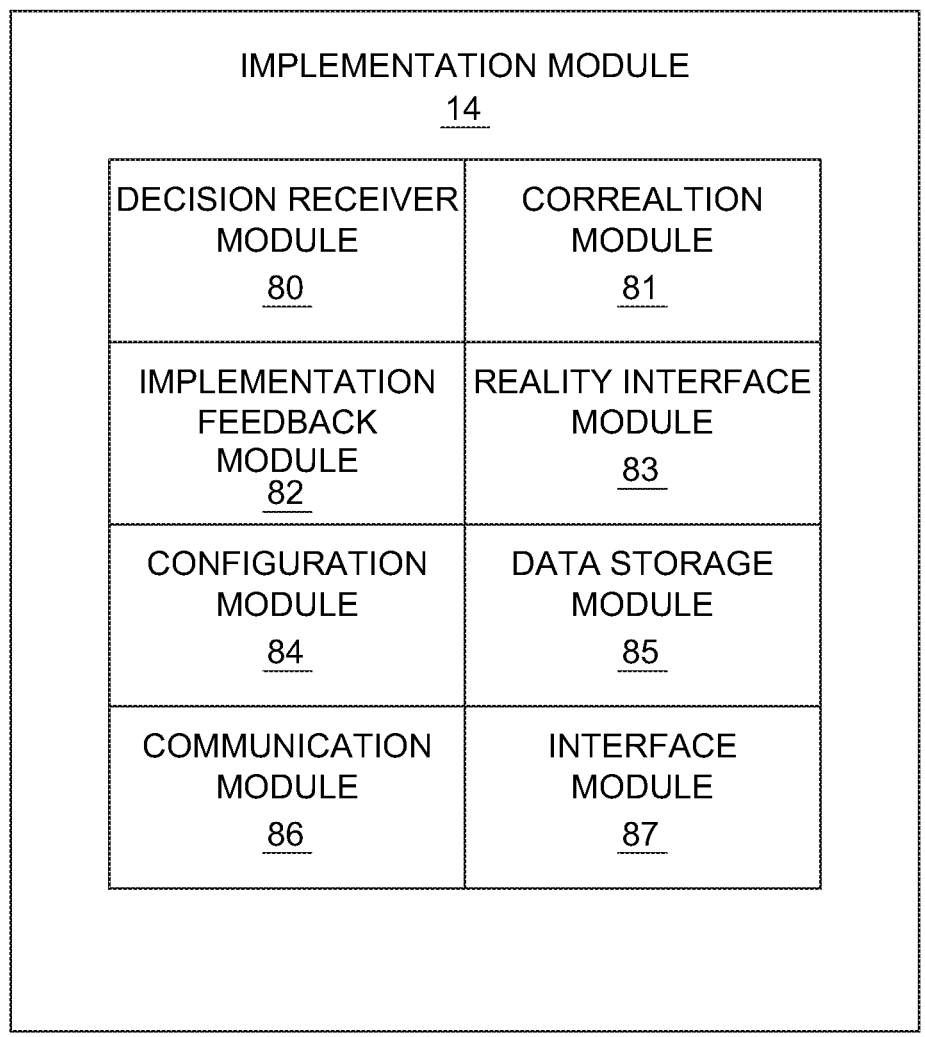
FIG. 5 is a module diagram of an implementation module of a system of gamification of real-life events, according to one embodiment of the invention.

FIG. 5 is a module diagram of an implementation module of a system of gamification of real-life events, according to one embodiment of the invention. There is shown an implementation module 14 including a decision receiver module 80, a correlation module 81, an implementation feedback module 82, a reality interface module 83, a configuration module 84, a data storage module 85, a communication module 86, and an interface module 87.

The implementation module 14 is configured to receive an implementation instruction and automatically affect a real-world occurrence associated with the implementation instruction. The implementation module 14 is in communication with the various components and modules of a system of gamification of real-life events over a computerized network. The implementation module 14 is configured to distribute a sum of real-world currency to a recipient bank account in response to implementation instructions.

The implementation module 14 includes a decision receiver module 80 in communication with the modules and components of the implementation module 14. The decision receiver module 80 is configured to receive "decisions" from another module, such as but not limited to a control module and/or an interface engine module of a system of gamification of real-life events. "Decisions" as used herein mean instructions for a real-world implementation that may be the result of one or more game actions/choices/selections of one or more virtual communities/players. Such instructions may be include contextual information such as but not limited to associated real-world bank account numbers, NGO index numbers, amounts, QR codes of products/services to be purchased, and the like and combinations thereof. Contextual information may be inferred by a sender identification, sender location, message protocol, message time, message timing, data ordering or the like or combinations there. A decision receiver module 80 may simply receive the decision or may further process the decision, change a data format or protocol, combine the decision with other decisions, or the like or combinations thereof. Non-limiting examples of a decision receiver module may be a system as described in U.S. Patent Publication No.: 2003/0069870, by Ras et al.; or a system as described in U.S. Pat. No. 7,478,076, issued to Owen et al., which are incorporated for their supporting teachings herein.

The implementation module 14 includes a correlation module 81 in communication with the modules and components of the implementation module 14. The correlation module 81 includes instructions and/or systems for matching associated data, comparing/combining the same, and processing such comparisons to provide statistical or other data/conclusions/results/etc. such that actions of other modules may be audited, results may be compared to efforts expended to obtain such results, changes in circumstances may be monitored, recorded and reported, and the like and combinations thereof. Such a system may include controls for data formatting, data conversion, statistical processing, reporting templates, error checking, and the like and combinations thereof.

The implementation module 14 includes an implementation feedback module 82 in communication with the modules and components of the implementation module 14. The implementation feedback module 82 is configured to provide feedback information to another module in association with one or more of a received decision, an implemented decision, an implementation error, or the like or combinations thereof of a system of gamification of real-life events. Such a feedback module may monitor one or more processes described herein and may filter, process such monitored information as appropriate to generate feedback information. Non-limiting examples of an implementation feedback module 82 may be a feedback module as described in U.S. Patent Publication No.: 2012/0078669, by Harkins et al.; or a feedback module as described in U.S. Patent Publication No.: 2009/0100050, by Erol et al., which are incorporated for their supporting teachings herein.

The implementation module 14 includes a reality interface module 83 in communication with the modules and components of the implementation module 14. The reality interface module 83 is configured to convert one or more decisions into a real-world implementation. Such may include combining one or more decisions into a composite decision that may or may not identically reflect the exact received decisions. As a non-limiting example, decisions may be categorized and/or flagged according to the commonality of the decisions, such that outlier decisions (decisions having few or no similar or identical decisions within a group) may be recognized, processed, stored, and/or otherwise given special attention. Such may advantageously identify creative solutions and/or players that may be acting contrary to the purposes of the implementation module.

Accordingly, new ideas may be routed to experts and/or other processing and advantageously brilliant new ideas may be spotted and the Leroy Jenkins players may be stopped from adversely impacting the real-world. Such a system may include a module for dispensing cash, routing funds between bank accounts, ordering supplies, giving instructions to service providers, displaying media, dispensing equipment, operating manufacturing facilities, and the like and combinations thereof, wherein such may be according to and/or consequential to one or more decisions from a computer game.

The implementation module 14 includes a configuration module 84 in communication with the modules and components of the implementation module 14. The configuration module includes a listing of configuration settings that are relevant to operation of one or more modules of the implementation module 14. Non-limiting examples of such include: a metadata header of a file, a config file, an index, an xml file, and the like and combinations thereof.

The implementation module 14 includes a data storage module 85 configured to store data received and sent from a player/user of a system of gamification of real events. The data storage module 85 is configured to store data transferred between the player/user and a game object of an ongoing computer game. Data storage modules may be databases or data files, and the memory storage device may be hard drives or tapes.

The implementation module 14 includes an interface module 87 configured to provide interface controls to a player/user to access content or data of an ongoing computer game over a computerized network. The interface module 87 includes a display module configured to provide visual display to a player/user while interacting and navigating the content or data of the ongoing computer game. The display module may be a television, computing device monitor, mobile device screen, tablet, etc. The display module is configured to provide video conferencing capabilities, wherein the player/user is in communication with another player/user over a computerized network.

The interface module 87 includes an input module in communication with a communication module 86 and is configured to provide input means to a player/user. The input module includes a keyboard or input device configured to provide input capabilities to a player/user. The input module may include an abbreviated keyboard configured to provide input capabilities to a player/user. The input module may include a microphone module configured to receive and store voice data, thereby providing voice transmitting capabilities to a player/user in coordination with the display module of the interface module 87.

The implementation module 14 includes a communication module 86 in communication with an interface module of a system of gamification of real events. The communication module is configured to provide communication means to the player/user over a computerized network. The communication is in communication with a computerized network and configured to transmit data therethrough. The communication module includes wireless communication means, in addition to a direct line communication connection. The communication module includes a security module configured to provide a secure connection to a computerized network and transmission therethrough.

Figure 6:
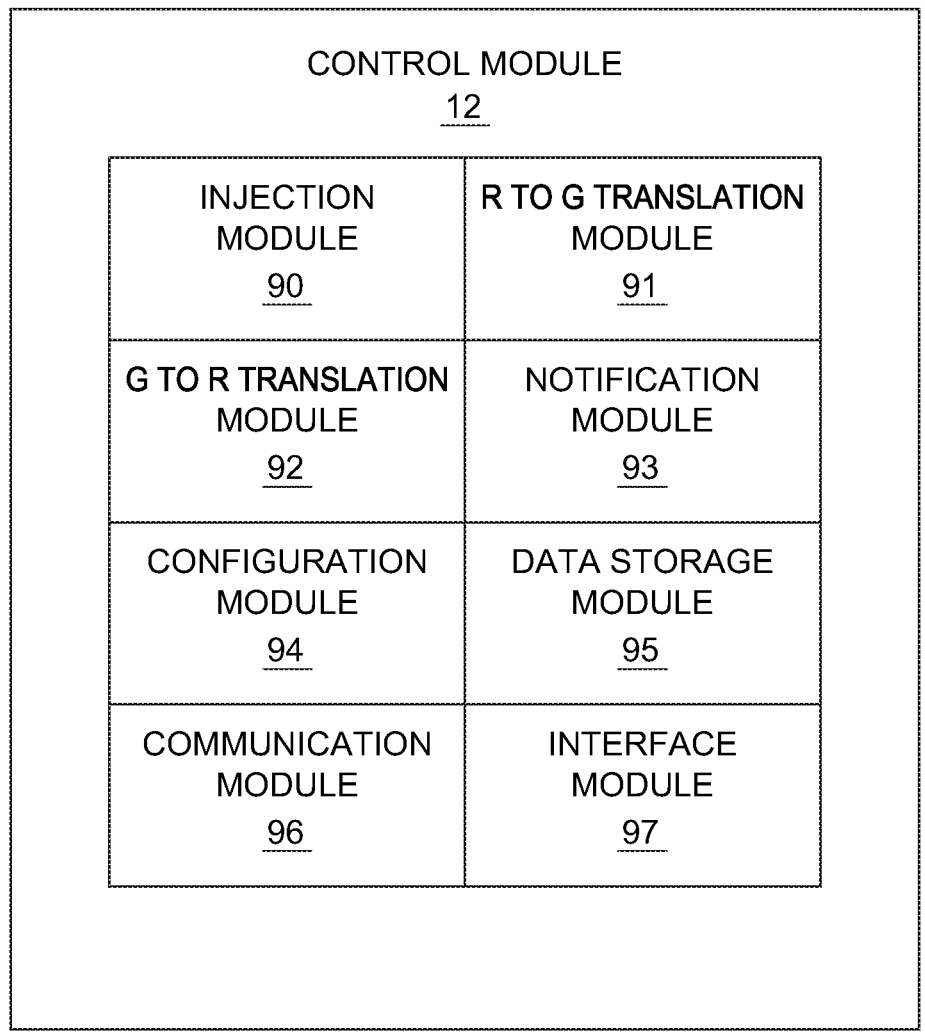
FIG. 6 is a module diagram of a control module of a system of gamification of real-life events, according to one embodiment of the invention.

FIG. 6 is a module diagram of a control module of a system of gamification of real-life events, according to one embodiment of the invention. There is shown a control module 12 including an injection module 90, a R to R translation module 91, a G to R translation module 92, a notification module 93, a configuration module 94, a data storage module 95, a communication module 96, and an interface module 97.

The illustrated control module 12, includes a processor, in communication with each of an observer module, an interface engine module, and an implementation module, of a system of gamification of real-life events, with at least one such connection being over a computerized network. The control module 12 is configured to convert real-life data from the observer module into a game object. The control module 12 is also configured to provide the created game object to the interface engine module for injection into an ongoing multi-player computer game. The control module 12 is configured to convert a player interaction into an implementation instruction and provide the same to the implementation module.

The control module 12 includes an injection module 90 configured to generate instructions for inserting an injection object into an ongoing computer game. Such may include generating an interrupt message for a player regarding a new challenge, appending an opportunity (quest, job, problem, etc.) to an interface (Nonplayer character chat script, job board, quest list, etc.), subjecting a virtual community to one or more characteristic changes that may or may not be specifically associated with an identified cause (step-like increase in reported pollution or disease levels and the players are not told why or even specifically informed that it has happened and have to figure out what it going on), or the like or combinations thereof. Non-limiting examples of an injection module may include a game initialization engine such as an initialization file, config file, variable data loader such as that used in the game entitled Skyrim by Bethesda Softworks of Rockville Md.

The control module 12 includes an R to G translation module 91 in communication with the modules and components of the control module 12. The R to G translation module 91 is configured to perform data conversion on data reported from an observer module and convert it to a format that is more appropriate to an ongoing computer game. Such may include generating, combining, processing, filtering, and the like and combinations thereof one or more reality objects and/or injection objects.

The control module 12 includes a G to R translation module 92 in communication with the modules and components of the control module 12. The G to R translation module 92 is configured to perform data conversion on game data of an ongoing computer game and convert it to a format that is more appropriate to a real-world implementation. Such may include generating, combining, processing, filtering, and the like and combinations thereof one or more reality objects and/or decisions/decision objects.

The control module 12 includes a notification module 93 in communication with the modules and components of the control module 12. The notification module 93 is configured to notify one or more player accounts, virtual communities, expert user accounts, third party accounts (NGO, government agency, supplier, service provider, village, etc.) and the like and any combinations thereof of the creation of a decision, injection object, other notification, data reported from an observer module, constituents thereof and the like and combinations thereof. Such may occur by email, text, ftp transfer, automated telephone message, wireless communication, and the like and combinations thereof and may include metadata, a copy of the subject of the notification, communication addresses to one or more other parties, and the like and combinations thereof. Non-limiting examples of a notification module may be a notification module as described in U.S. Pat. No. 8,140,015, issued to Ohkita; or a system as described in U.S. Pat. No. 5,961,651, issued to Gittins et al., which are incorporated for their supporting teachings herein.

The control module 12 includes a configuration module 94 in communication with the modules and components of the control module 12. The configuration module 94 is configured to include a listing of configuration settings that are be relevant to operation of one or more modules of a system of gamification of real-life events. Non-limiting examples of such include: a metadata header of a file, a config file, an index, an xml file, and the like and combinations thereof.

The control module 12 includes a data storage module 95 in communication with the modules and components of the control module 12. The data storage module is configured to store data received and sent from a player/user. The data storage module is configured to store data transferred between the players/users during game play of an ongoing computer game over a computerized network. Data storage modules may be databases or data files, and the memory storage device may be hard drives or tapes.

The control module 12 includes an interface module 97 in communication with the modules and components of the control module 12. The interface module 97 is configured to provide interface controls to a player/user to access content or data of the game play of an ongoing computer game over a computerized network. The interface module 97 includes a display module configured to provide visual display to a player/user while interacting and navigating the content or data of the game play of an ongoing computer game over a computerized network. The display module may be a television, computing device monitor, mobile device screen, etc. The display module is configured to provide video conferencing capabilities, wherein the player/user is in communication with another player/user of an ongoing computer game through the interface module over a computerized network.

The interface module includes an input module in communication with a communication module 96. The input module is configured to provide input means to a player/user. The input module includes a keyboard or input device configured to provide input capabilities to a player/user. The input module may include an abbreviated keyboard configured to provide input capabilities to a player/user. The input module may include a microphone module configured to receive and store voice data, thereby providing voice transmitting capabilities to a user in coordination with the display module of the interface module.

The control module 12 includes a communication module 96 in communication with the interface module 97 and configured to provide communication means to a player/user over a computerized network. The communication module 96 is in communication with a computerized network and configured to transmit data therethrough. The communication module 96 includes wireless communication means, in addition to a direct line communication connection. The communication module 96 includes a security module configured to provide a secure connection to a computerized network and transmission therethrough.

Figure 7:
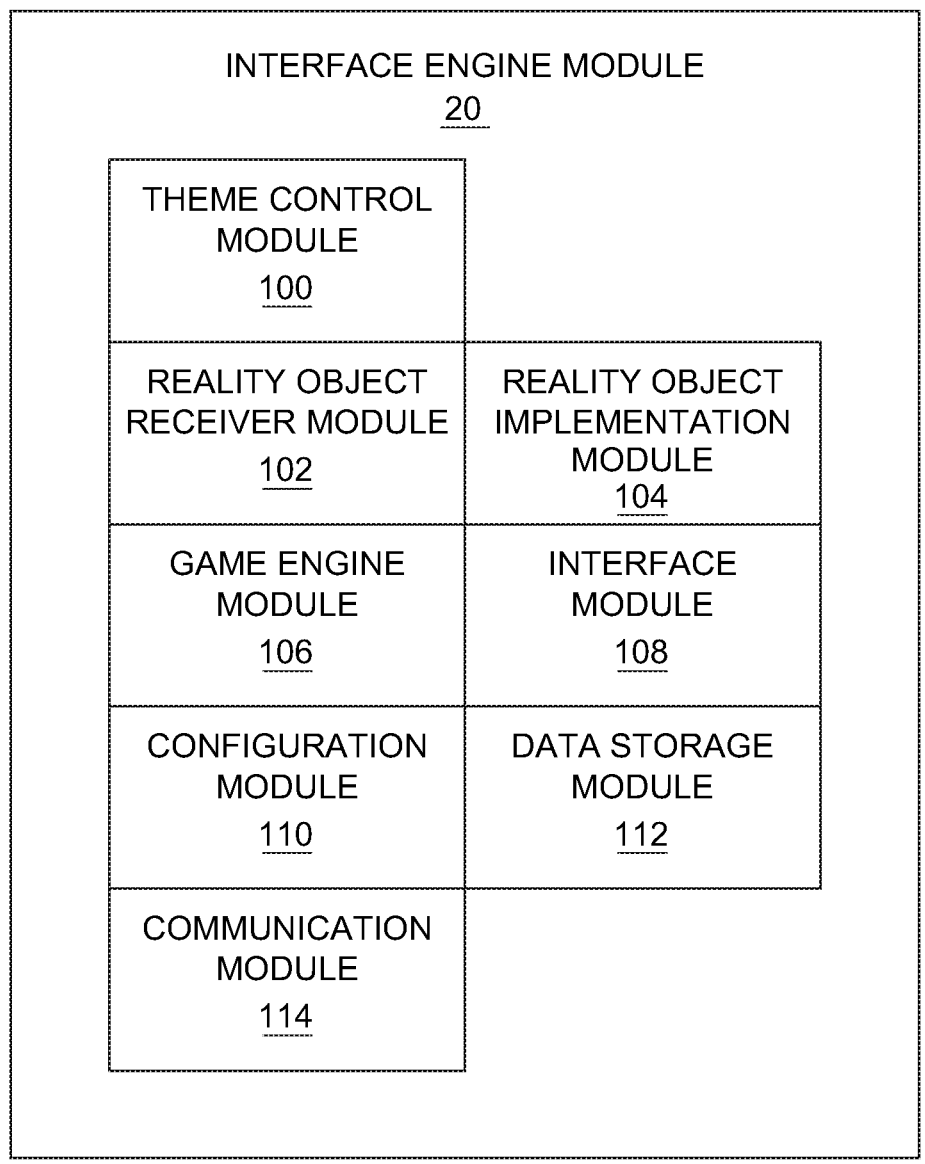
FIG. 7 is an interface engine module of a system of gamification of real-life events, according to one embodiment of the invention.

FIG. 7 is an interface engine module of a system of gamification of real-life events, according to one embodiment of the invention. There is shown an interface engine module 20 including a theme control module 100, a reality object receiver module 102, a reality object implementation module 104, a game engine module 106, an interface module 108, a configuration module 110, a data storage module 112, and a communication module 114.

The illustrated interface engine module 20 is configured to operate an ongoing computerized game over a computerized network. The interface engine module 20 is in communication with the modules and components of a system of gamification of real-life events over a computerized network. The interface engine module 20 includes game objects with which a player may interact therewith. The interface engine module 20 is configured to operate an ongoing multi-player game experience over a computerized network. The interface engine module 20 is configured to operate an ongoing multi-player game experience associated with a social media network.

The interface engine module 20 includes a theme control module 100 in communication with the modules and components of the interface engine module 20. The theme control module 100 is configured to selectably manage display of a plurality of media/multimedia files decorating the user interface and/or giving color/flavor to the same. In particular, user interfaces generally include portions thereof that are decorative, including but not limited to protected white space, borders, decorative transition elements, selectable graphical objects linked to commands, avatars, avatar decorations, environmental objects and/or effects, splash screens, and the like and combinations thereof. A theme control module may include instructions for associating particular media files (images, video, sound, fonts, etc.) with such portions and/or for configuring size, space, location of the same. A theme control module may include a variety of predefined configuration settings or "skins" whereby the look of the user interface may be altered for beneficial effect. This is particularly useful for a system that is intended to work closely with an individual user and images, formatting, colors, sounds, and the like that are familiar, comfortable, comforting, and/or having particular significance to the user will generally promote more effective use of the system. Accordingly, a single game engine may be utilized but adapted to a plurality of styles of virtual communities and such communities may be stylized as desired, such as but not limited to resembling the local color of a real-world location with which they are associated.

The interface engine module 20 includes a reality object receiver module in communication with the modules and components of the interface engine module 20. The reality object receiver module 102 is configured to receive one or more reality objects and/or injections objects and perform data conversion, combinations, processing on the same and may pass data to a reality object implementation module.

The interface engine module 20 includes a reality object implementation module 104 in communication with the modules and components of the interface engine module 20. The reality object implementation module 104 is configured to implement one or more reality objects into an ongoing computer game, such as but not limited to implementing one or more instructions of an injection module, of a system of gamification of real-life events, that may be modified and/or guided by information contained in an injection object and/or a reality object.

The interface engine module 20 includes a game engine module 106 in communication with the modules and components of the interface engine module 20. The game engine module 106 includes game architecture for one or more games and/or may provide a framework of rules within which players operate and play an ongoing computer game. Further, it may include tools and/or components for the development and creation of games. Such may include middleware, display adapters, MMO engines, first person shooter engines, civilization-style engines, rogue-like engines, social network game engines and the like and combinations thereof. Non-limiting examples of game engines include a game engine as described in U.S Patent Publication No.: 2006/0014585, by Neogi; or a game engine as described in U.S. Patent Publication No.: 2008/0039166, by Harris et al.

The interface engine module 20 includes a configuration module 110 in communication with the modules and components of the interface engine module 20. The configuration module 110 includes a listing of configuration settings that may be relevant to operation of one or more modules of a system of gamification of real-life events. Non-limiting examples of such include: a metadata header of a file, a config file, an index, an xml file, and the like and combinations thereof.

The interface engine module 20 includes a data storage module 112 in communication with the modules and components of the interface engine module 20. The data storage module 112 is configured to store data received and sent from a player/user of an ongoing computer game over a computerized network. The data storage module 112 is configured to store data transferred between the players/users during game play of an ongoing computer game.

The interface engine module 20 includes an interface module 108 is in communication with the modules and components of the interface engine module 20. The interface module 108 is configured to provide interface controls to a player/user to access content or data of an ongoing computer game over a computerized network. The interface module 108 includes a display module configured to provide visual display to a player/user while interacting and navigating the content or data of the ongoing computer game play over a computerized network. The display module may be a television, computing device monitor, mobile device screen, tablet, etc. The display module is configured to provide video conferencing capabilities, wherein the player/user is in communication with another player/user through the interface module.

The interface module includes an input module in communication with a communication module 114. The input module is configured to provide input means to a player/user of an ongoing computer game over a computerized network. The input module includes a keyboard or input device configured to provide input capabilities to a player/user. The input module may include an abbreviated keyboard configured to provide input capabilities to a player/user. The input module may include a microphone module configured to receive and store voice data, thereby providing voice transmitting capabilities to a player/user in coordination with the display module of the interface module.

The interface engine module 20 includes a communication module 114 in communication with the modules and components of the interface engine module 20. The communication module is configured to provide communication means to a player/user over a computerized network. The communication module 114 is in communication with a computerized network and configured to transmit data therethrough. The communication module includes wireless communication means, in addition to a direct line communication connection. The communication module includes a security module configured to provide a secure connection to a computerized network and transmission therethrough.

Figure 8:
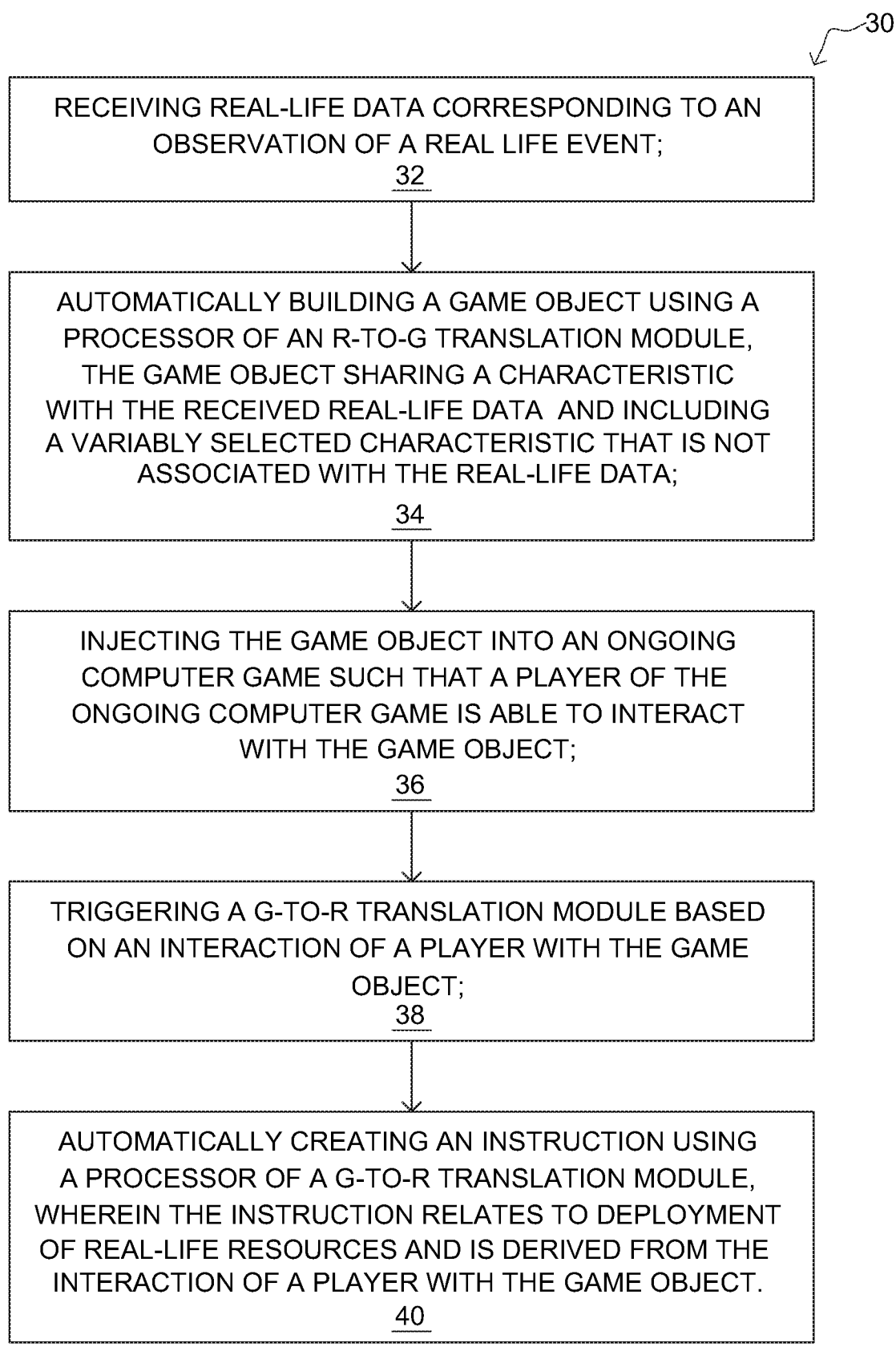
FIG. 8 is a flow diagram of a method of gamification according to one embodiment of the invention.
Figure 9:
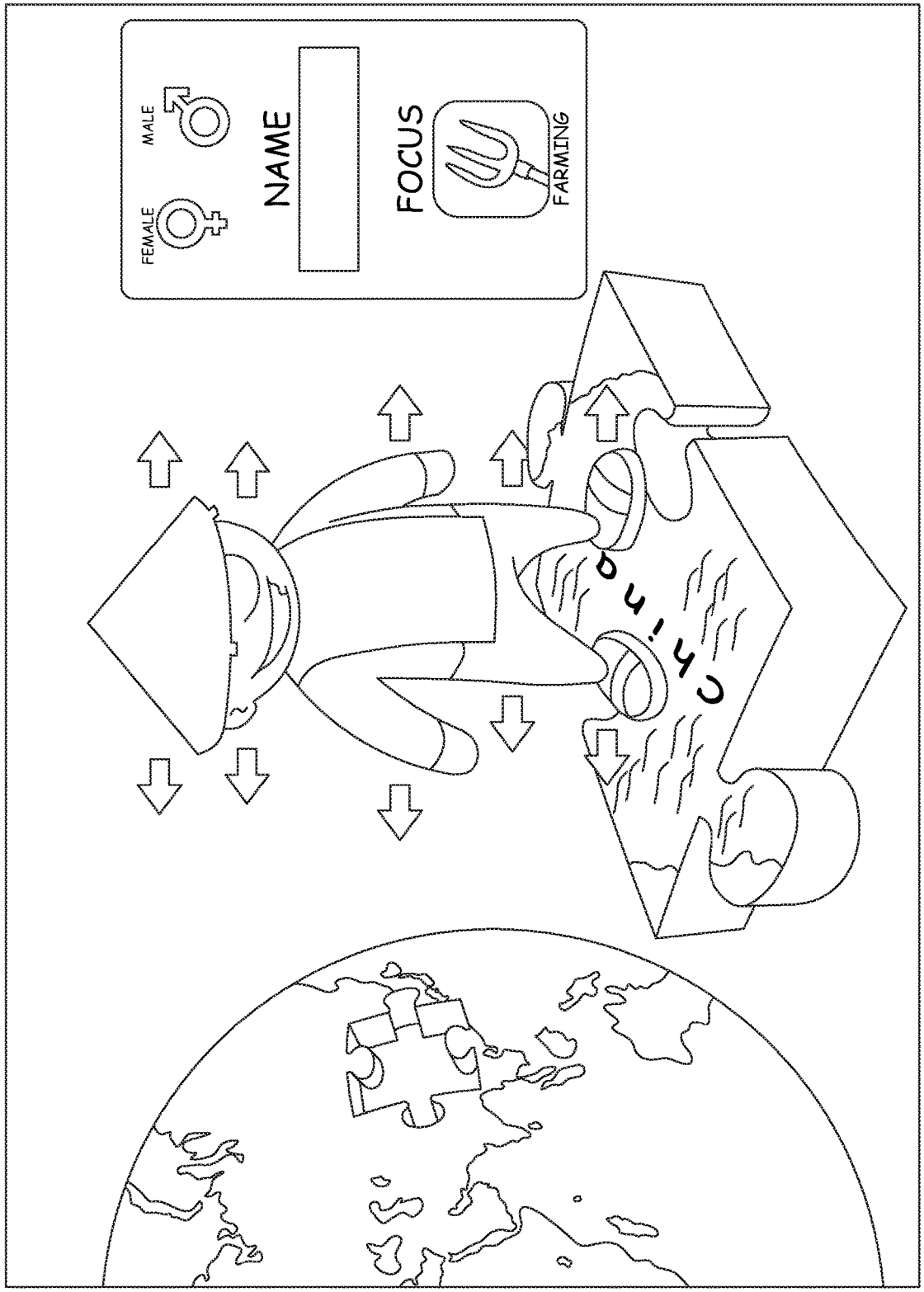
FIGS. 9-12 illustrate prophetic examples of screenshots of a system of gamification of real-life events, according to one embodiment of the invention.
Figure 10:
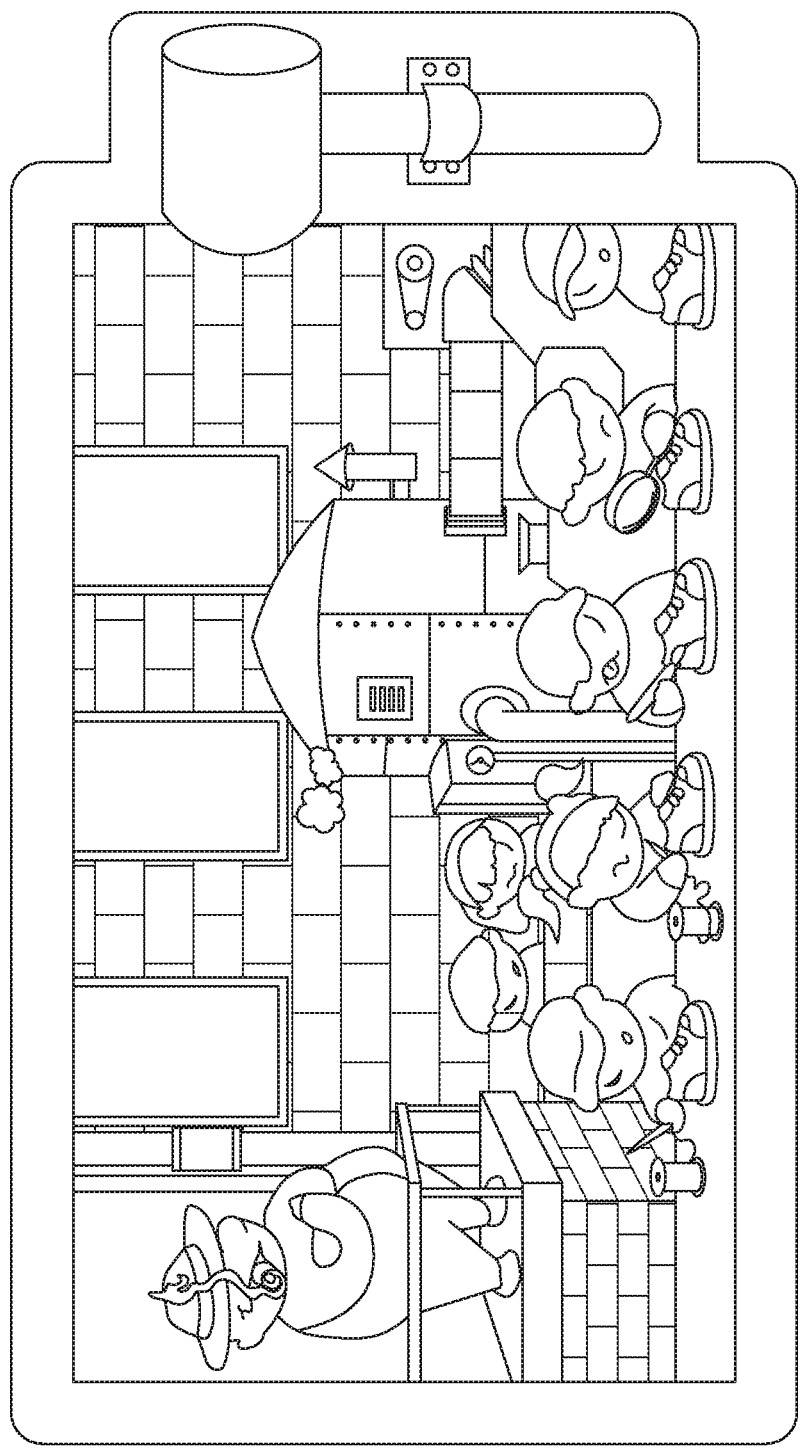
Figure 11:
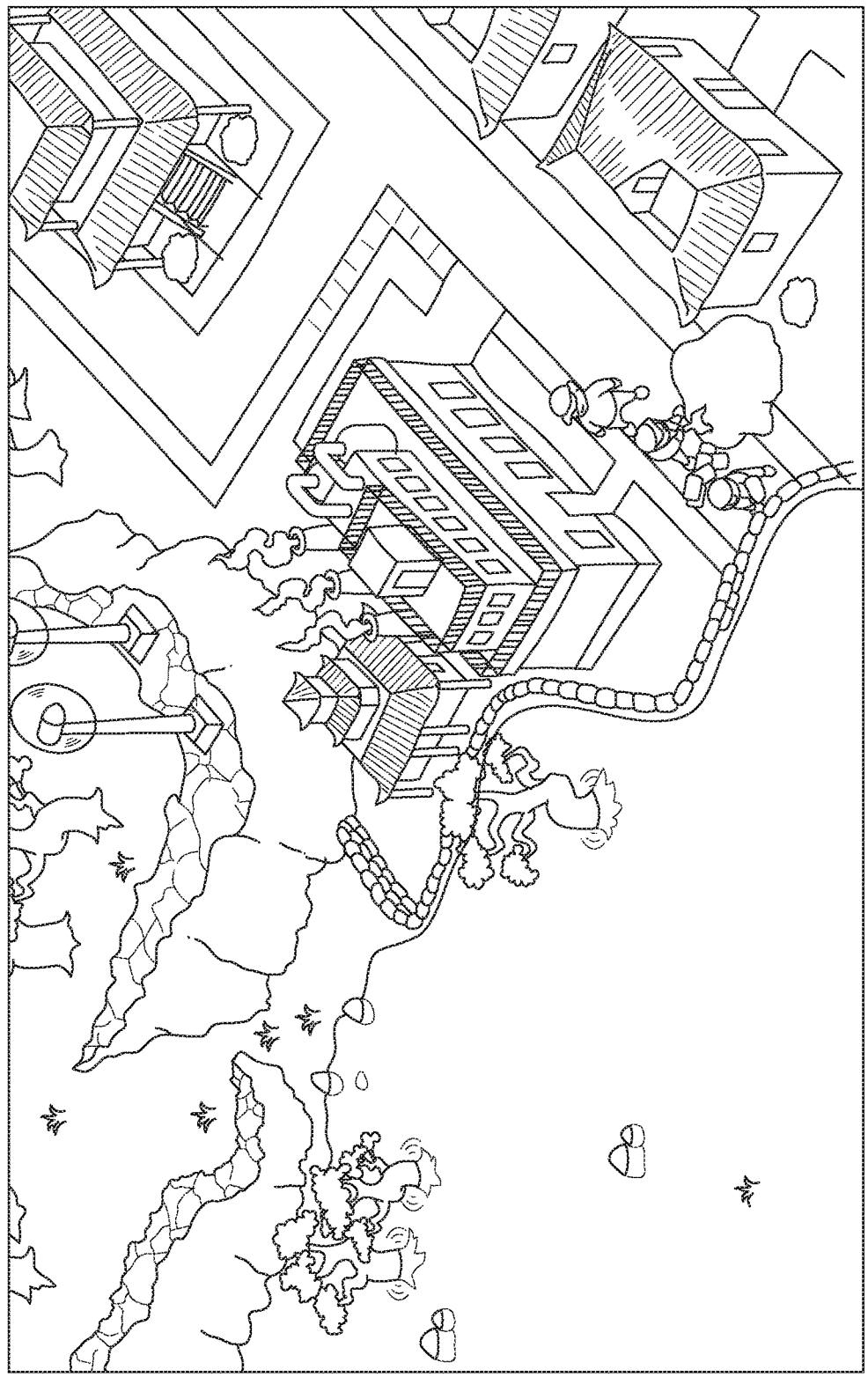
Figure 12:
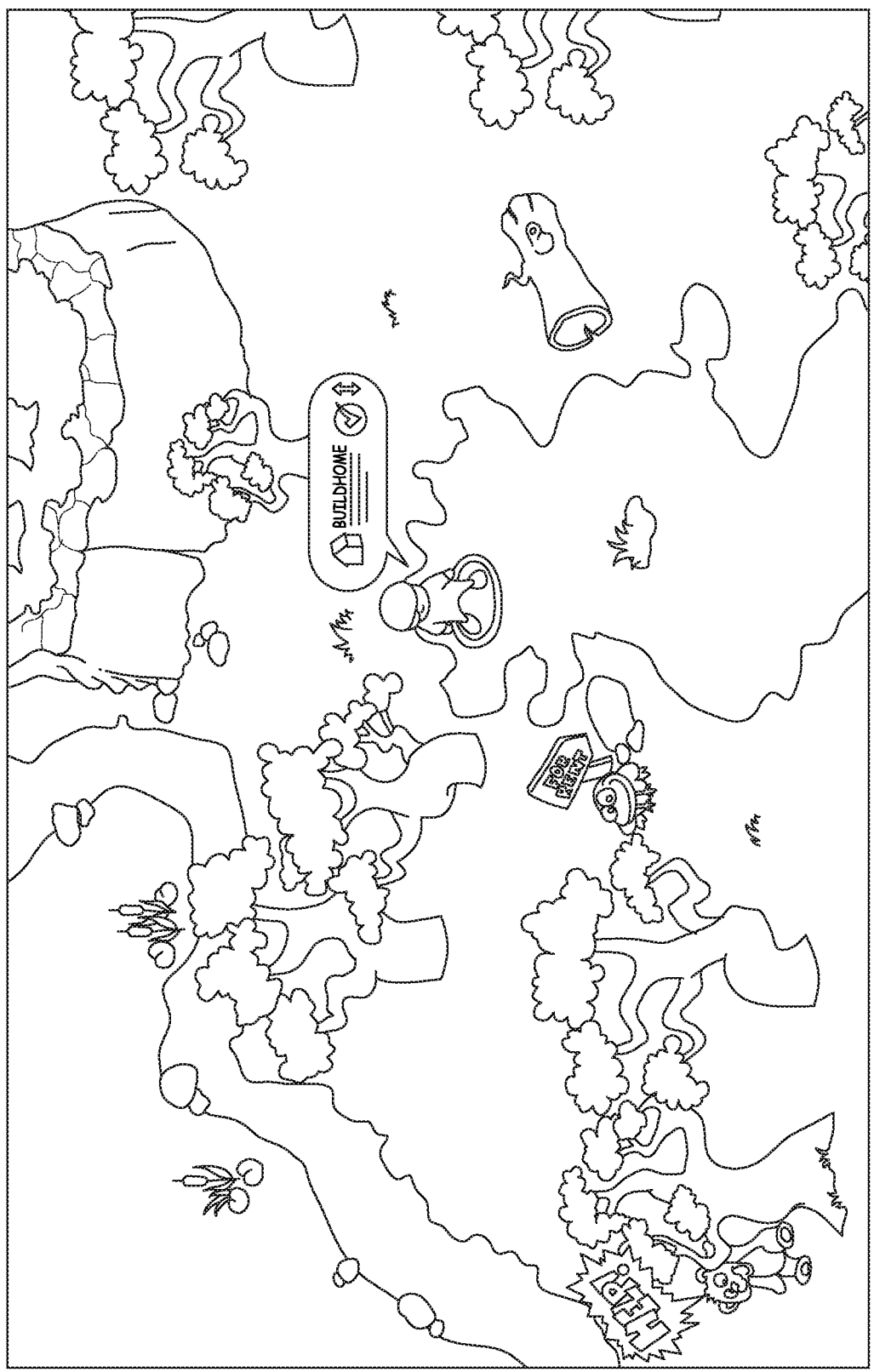

FIG. 8 illustrates a method of gamification according to one embodiment of the invention. The illustrated method of gamification of real-life events 30 includes the steps of receiving real-life data corresponding to an observation of a real-life event 32. The method 30 includes the step of automatically building a game object using a processor of an R-to-G translation module, the game object sharing a characteristic with the received real-life data and including a variably selected characteristic that is not associated with the real-life data 34. The method 30 also includes the step of injecting the game object into an ongoing computer game such that a player of the ongoing computer game is able to interact with the game object 36. The method of gamification of real-life events 30 includes the step of triggering a G-to-R translation module based on an interaction of a player with the game object 38. The method 30 further includes the step of automatically creating an instruction using a processor of a G-to-R translation module, wherein the instruction relates to deployment of real-life resources and is derived from the interaction of a player with the game object 40.

Further steps include, but are not limited to: generating virtual geographic information from real-life geographic information of the received real-life data and associating the virtual geographic information with the automatically build game object; notifying a plurality of players of the automatically created game object; sensing a real-life event through a sensor module and generating real-life data therefrom; collecting data about a real-life circumstance associated with the deployment of real-life resources and determining an impact of the deployment of the real-life resources, thereby forming impact data; receiving impact data regarding determining an impact of the deployment of the real-life resources and altering a game object according to a characteristic of the impact data received; processing a plurality of interactions with the game object, thereby determining a composite interaction and wherein the step of triggering the G-to-R translation module is based on the composite interaction and the instruction is derived from the composite interaction; notifying an expert of at least one of a characteristic of the automatically built game object and a real-life data characteristic, receiving an instructional reply from the expert and displaying the instructional reply to a player of the ongoing computer game; filtering a data feed associated with real-life events for a predefined characteristic, generating real-life data therefrom and providing such real-life data to an R-to-G translation module; and notifying a plurality of game players over a social media network of a characteristic of the automatically created game object. It may also be that the step of injecting the game object into an ongoing computer game is performed such that a plurality of players are able to interact with the game object.

Such steps may operate using one or more of the modules described herein and such modules may be in communication to the degree necessary with each other to perform such steps.

FIGS. 9-12 illustrate prophetic examples of screenshots of a system of gamification of real-life events, according to one embodiment of the invention. The screenshots illustrate gaming environments, suggest potential single player and/or multiplayer interactions with game objects, player avatar characteristics, real-world correlations between game objects and real-world data, presentation of real-life issues presented in game form, cosmetic characteristics of a game, options and selections available for players and the like and combinations thereof. Such a game may include a variety of screen interfaces for interacting with various game objects and receiving various forms of information on which to base game play and game interaction. Further, other player behavior may be visible in some screens and collaboration, communication, association and the like among players may thereby be facilitated.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate a particular sequence of game play and real-life interaction, it is understood that variations on sequence, number, and timing of such processes, steps, methods, and the like may be used and that such may be implemented within a great number of simultaneous and/or sequential processes and that real life data may be fed into the system in real-time from a great variety of sources and/or may be compressed, summed, averaged, differentiated, diversified, split, multiplied or otherwise made so that there is not a one-to-one relationship between real-life issues and injected game objects. As a non-limiting example, observations regarding a single real-life hurricane may be split into several hurricane derived game objects into a plurality of game settings.

Additionally, although the figures illustrate particular screen interfaces that are prophetic examples of game operation/interaction, it is understood that the interfaces thereof are plethoric.

It is also envisioned that real-life issues/data injected into the game may be masked or otherwise altered on injection to varying degrees such that players may or may not be aware of a causal connection between real-life events and new game objects/circumstances. There may be conversion tables to convert real-life data to genre appropriate game data. There may be randomization tables for conversion of the same.

It is expected that there could be numerous variations of the design of this invention. An example is that the game may be a massive multiplayer online game, a social media game, a single player puzzle game, a first person shooter-style game, a multiplayer strategy game, and the like and combinations thereof.

Finally, it is envisioned that the components of the device may be constructed of a variety of materials, Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A method of operating a computerized network, comprising the steps of:
   a) receiving real-life data corresponding to real-life geographic data;
   b) automatically building an object, wherein the object is virtual within a computing environment, using a processor of an R-to-G translation module, the object sharing a characteristic with the received real-life data and including a variably selected characteristic that is not associated with the real-life data;
   c) injecting the object into an ongoing multi-user computer program such that a user of the ongoing computer program is able to interact with the object;
   d) triggering a G-to-R translation module based on an interaction of a user with the object; and
   e) automatically creating an instruction using a processor of a G-to-R translation module, wherein the instruction relates to deployment of real-life financial resources and is derived from the interaction of a user with the virtual object.

2. The method of claim 1, further comprising generating virtual geographic information from real-life geographic information of the received real-life data and associating the virtual geographic information with the automatically build object.

3. The method of claim 1, further comprising notifying a plurality of users of the automatically created object.

4. The method of claim 1, further comprising sensing a real-life event through a sensor module and generating real-life data therefrom.

5. The method of claim 1, further comprising collecting data about a real-life circumstance associated with the deployment of real-life resources and determining an impact of the deployment of the real-life resources, thereby forming impact data.

6. The method of claim 1, further comprising receiving impact data regarding determining an impact of the deployment of the real-life resources and altering an object within the ongoing multi-user computer program according to a characteristic of the impact data received.

7. The method of claim 1, wherein the step of injecting the object into an ongoing multi-user computer program is performed such that a plurality of users are able to interact with the object.

8. The method of claim 1, further comprising the step of processing a plurality of interactions with the object, thereby determining a composite interaction and wherein the step of triggering the G-to-R translation module is based on the composite interaction and the instruction is derived from the composite interaction.

9. The method of claim 1, further comprising notifying an expert of at least one of a characteristic of the automatically built object and a real-life data characteristic, receiving an instructional reply from the expert and displaying the instructional reply to a user of the ongoing multi-user computer program.

10. The method of claim 1, further comprising filtering a data feed associated with real-life events for a predefined characteristic, generating real-life data therefrom and providing such real-life data to an R-to-G translation module.

11. The method of claim 1, further comprising notifying a plurality of users over a social media network of a characteristic of the automatically created object.

12. A system for gamification of real-life events over a computerized network, comprising:
   a) an observer module configured to generate real-life data in response to observation of a real-life event relating to real-life geographic data;

b) an interface engine module configured to operate an ongoing computerized program including game objects with which a player may interact;
c) an implementation module configured to receive an implementation instruction and to automatically effect a real-world occurrence associated with the implementation instruction; and
d) a control module, including a processor, in communication with each of the observer module, the interface engine module, and the implementation module, with at least one such connection being over a computerized network, and configured to convert real-life data from the observer module into a game object, provide the created game object to the interface engine module for injection into an ongoing computer program, and convert a player interaction into an implementation instruction and provide the same to the implementation module.

13. The system of claim 12, further comprising a player module in communication with the interface engine module and configured to permit a player to play the ongoing program and wherein the control module includes an R-to-G translation module and a G-to-R translation module.

14. The system of claim 12, wherein the generated real-life data includes geographic data.

15. The system of claim 12, wherein the interface engine module operates an ongoing multiplayer game experience.

16. The system of claim 12, wherein the interface engine module operates an ongoing multiplayer game experience associated with a social media network.

17. The system of claim 12, wherein the implementation module distributes a sum of real-world currency to a recipient bank account in response to implementation instructions.

18. The system of claim 12, wherein the observer module further collects data about real-life circumstance associated with deployment of real-life resources by the implementation module and determines an impact of the implementation instruction, thereby forming impact data.

19. The system of claim 12, wherein the observer module filters a data feed associated with real-life events for a predefined characteristic, generating real-life data therefrom and providing such real-life data to an R-to-G translation module of the control module.

20. A method of operating a computerized network, comprising the steps of:

a) receiving real-life data corresponding to an observation of a real-life event relating to real-life geographic information;
b) automatically building an object, wherein the object is a virtual object within a computing environment, using a processor of an R-to-G translation module, the object sharing a characteristic with the received real-life data and including a variably selected characteristic that is not associated with the real-life data;
c) injecting the object into an ongoing computer program such that a user of the ongoing computer program is able to interact with the object; wherein the step of injecting the object into an ongoing computer program is performed such that a plurality of users are able to interact with the object;
d) triggering a G-to-R translation module based on an interaction of a user with the object;
e) automatically creating an instruction using a processor of a G-to-R translation module, wherein the instruction relates to deployment of real-lite financial resources and is derived from the interaction of a user with the object;
f) generating virtual geographic information from real-life geographic information of the received real-life data and associating the virtual geographic information with the automatically build object;
g) notifying a plurality of players of the automatically created object;
h) sensing a real-life event through a sensor module and generating real-life data therefrom;
i) collecting data about a real-life circumstance associated with the deployment of real-life financial resources and determining an impact of the deployment of the real-life financial resources, thereby forming impact data;
j) receiving impact data regarding determining an impact of the deployment of the real-life resources and altering an object according to a characteristic of the impact data received; and
k) processing a plurality of interactions with the object, thereby determining a composite interaction and wherein the step of triggering the G-to-R translation module is based on the composite interaction and the instruction is derived from the composite interaction.

* * * * *